US009877232B2

(12) United States Patent
Persson et al.

(10) Patent No.: US 9,877,232 B2
(45) Date of Patent: Jan. 23, 2018

(54) METHODS AND NODES FOR MANAGING BEARERS

(71) Applicant: Telefonaktiebolaget L M Ericsson (publ), Stockholm (SE)

(72) Inventors: Fredrik Persson, Märsta (SE); Jari Vikberg, Järna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 303 days.

(21) Appl. No.: 14/652,665

(22) PCT Filed: May 20, 2015

(86) PCT No.: PCT/SE2015/050584
§ 371 (c)(1),
(2) Date: Jun. 16, 2015

(87) PCT Pub. No.: WO2016/186543
PCT Pub. Date: Nov. 24, 2016

(65) Prior Publication Data
US 2017/0150403 A1    May 25, 2017

(51) Int. Cl.
H04W 28/24    (2009.01)
H04W 76/02    (2009.01)

(52) U.S. Cl.
CPC ........... H04W 28/24 (2013.01); H04W 76/02 (2013.01)

(58) Field of Classification Search
CPC ............................ H04W 28/24; H04W 76/02
See application file for complete search history.

(56) References Cited

U.S. PATENT DOCUMENTS 9,007,899 B2    4/2015 Kotecha et al.
2012/0052866 A1    3/2012 Froehlich et al.
(Continued)

FOREIGN PATENT DOCUMENTS

EP    1 142 366 B1    8/2005
WO    2009/039886 A1    4/2009
WO    2015/028924 A2    3/2015

OTHER PUBLICATIONS

International Search Report and Written Opinion for Application No. PCT/SE2015/050584, dated Feb. 11, 2016, 11 pages.
(Continued)

Primary Examiner — Walter Divito
(74) Attorney, Agent, or Firm — Nicholson De Vos Webster & Elliott LLP

(57) ABSTRACT

A method and a radio network node for handling traffic on an Access Stratum "AS" bearer are disclosed. The radio network node receives, from a second core network node, an AS bearer request for setting up the AS bearer to carry traffic between a first core network node and a wireless communication device, wherein the AS bearer request includes a first AS Quality of Service profile, a second AS Quality of Service profile, and at least one criterion for applying the first or second AS Quality of Service profile when processing the traffic. The radio network node processes the traffic while applying the first or second AS Quality of Service profile based on whether one of the at least one criterion is fulfilled. Furthermore, corresponding methods, a first core network node, a second core network node and a wireless communication device for handling traffic on a common bearer are disclosed.

54 Claims, 12 Drawing Sheets

(56) References Cited

U.S. PATENT DOCUMENTS

2012/0106370 A1\* 5/2012 Radulescu ........ H04W 36/0083
370/252
2014/0119178 A1 5/2014 Zhao et al.
2014/0274080 A1 9/2014 Gilbert et al.
2017/0005859 A1\* 1/2017 Morsman ............ H04L 12/2801

OTHER PUBLICATIONS

"3rd Generation Partnership Project; Technical Specification Group Services and System Aspects; General Packet Radio Service (GPRS) enhancements for Evolved Packet Radio Service (GPRS) enhancements for Evolved Universal Terrestrial Radio Access Network (E-UTRAN) access (Release 10)," 3GPP TS 23.401 v10.4.0, (Mar. 2012), pp. 1-278.

\* cited by examiner

METHODS AND NODES FOR MANAGING BEARERS

CROSS-REFERENCE TO RELATED APPLICATIONS

This application is a National stage of International Application No. PCT/SE2015/050584, filed May 20, 2015, which is hereby incorporated by reference.

TECHNICAL FIELD

Embodiments herein relate to wireless communication systems, such as cellular networks. In particular, a method and a radio network node for managing an Access Stratum bearer, a method and a first core network node for handling traffic on a common bearer, a method and a second core network node for managing a common bearer as well as a method and a wireless communication device for managing a common bearer are disclosed. Corresponding computer programs and carriers therefor are also disclosed.

BACKGROUND

In wireless communication systems, it is sometimes desirable to manage Quality of Service (QoS) for traffic on a connection between a cellular device and a server acting as a gateway towards a communication network. The communication network is external to the wireless communication system. The QoS relates to requirements for the traffic. Examples of requirements for the traffic include bit rate, delay and the like. The QoS can be managed on a per subscriber level, e.g. per cellular device, a per subscriber group level, e.g. premium users may get special benefits in terms of e.g. bit rate. Some known wireless communication systems are described by the Third Generation Partnership Project (3GPP).

An overview of a 3GPP Long Term Evolution (LTE) network is illustrated in FIG. 1. The 3GPP network comprises a Core Network (CN) 11 and a Radio Access Network (RAN) 12. An external communication network 13 is exemplified by the Internet. The core network 11 comprises a Serving GateWay 20 (SGW), a Packet Data Network GateWay 21 (PDN GW), a Policy Charging and Rules Function (PCRF) 22 and a Mobility Management Entity (MME) 23. The radio network 12 comprises an eNB 31 and a radio device 32, or User Equipment (UE).

In 3GPP, QoS is managed on a per bearer level from the Core Network 11. The RAN 12 is responsible for setting up a radio bearer 41, radio resource management, and enforcing QoS according to a bearer QoS profile over the radio interface, e.g. LTE-Uu, in the downlink, i.e. towards the radio device 32, and over the core network 11 in the uplink, i.e. towards the Internet 13. In this overview of 3GPP LTE network, the QoS framework is illustrated. An Evolved Packet System (EPS) bearer 51 including a QoS profile is set up from the PDN GW 21 in the CN 11, and QoS is enforced in the PDN GW 21 and in the eNB 31 for the downlink, and in the radio device 32 and the eNB 31 for the uplink. In somewhat more detail, this means that the EPS bearer is built up by the radio bearer 41 and a S1 bearer 61. The S1 bearer 61 carries traffic between the eNB 31 and the PDN GW 21. Notably, the QoS profiles of the radio bearer and the S1 bearer are typically derived from the QoS profile of the EPS bearer. The EPS bearer may be referred to as a Non-Access Stratum (NAS) bearer and the radio bearer combined with the S1 bearer may be referred to as an Access Stratum (AS) bearer in case the LTE network is a generic telecommunication system. It shall also be said that the SGW 20 communicates with the PGW 21 via an S5/S8 interface 71 and that the SGW 20 communicates with the MME 23 via an S11 interface 81.

Many services and radio devices share the same radio and network resources. Real-time services, such as voice, video etc., are sharing the same resources as non-real-time services, such as Internet browsing, file download etc. One challenge in this area is how to ensure QoS (bit rates, packet delays, packet loss) for the Real-time services. 3GPP EPS provides efficient QoS mechanisms to ensure that the user experience of different services sharing the same resources is acceptable. Examples of the QoS mechanisms are:

1 Traffic Separation; different traffic types receive different treatment, such as queuing, priority, etc., in network,
2 3GPP provides for both relative QoS and absolute QoS, where absolute QoS uses Guaranteed Bit Rates (GBR),
3 GBR based admission control is used to reserve resources before traffic is admitted into the network or rejected otherwise
4 Policy and Charging Control (PCC) determines what treatment to apply to various traffic streams 3GPP discusses a concept referred to as a Packet Data Network (PDN). A PDN is in most cases an Internet Protocol (IP) network, e.g. Internet or an operator IP Multimedia Subsystem (IMS) service network. A PDN has one or more names; each name is defined in a string called Access Point Name (APN). A PDN GateWay (PGW or PDN GW) is a gateway towards one or more PDNs. A UE may have one or more PDN connections. A PDN connection is a logical IP tunnel between the UE and the PGW, allowing the UE to access a PDN of the PGW. The setup of a PDN connection is initiated from the UE.

Every PDN connection consists of one or more bearers as outlined above. See 3GPP TS 23.401 section 4.7.2 for a description of the EPS bearer concept. A bearer uniquely identifies one or more traffic flows, i.e. streams of traffic carried by the bearer. This means that the traffic flows receive the same QoS treatment between the UE and the PGW, when the traffic flows are carried by the same bearer. The EPS bearer is end-to-end between UE and PGW. Every PDN connection has at least one EPS bearer and this EPS bearer is called the default bearer, e.g. the default EPS bearer. All additional bearers on the PDN connection are called dedicated bearers, e.g. the dedicated EPS bearers.

Within the dedicated EPS bearers, there are two types of bearers: GBR and non-GBR bearers. Every EPS bearer is associated with the following QoS parameters: QoS Class Identifier (QCI) and Allocation and Retention Priority (ARP). GBR bearers are in addition associated with bit rate parameters for GBR and Maximum Bit Rate (MBR). Non-GBR bearers do not have bearer-level bit rate parameters. Instead, there is aggregate enforcement of all non-GBR bearers using Aggregate Maximum Bit Rates (AMBR) (APN-AMBR: defined per subscriber and APN, and UE-AMBR: defined per subscriber).

With reference to FIG. 2, a procedure for activating, or setting up, a dedicated bearer with a specific bearer QoS in a 3GPP EPS/LTE network is shown. See also 3GPP TS 23.401, section 5.4.1. The procedure is initiated by the PDN GW with input from the PCRF providing the PDN GW with an updated QoS profile. In case the PCRF is not deployed, the QoS is set locally by the PDN GW. The Figure shows dedicated bearer activation and similar steps are taken for the initial configuration of the default bearer in relation to UE attach to the network.

In FIG. 3, a procedure for modifying a bearer with bearer QoS update is shown. See also 3GPP TS 23.401, section 5.4.2.1. The procedure is initiated by the PDN GW with input from the PCRF providing the PDN GW with an updated QoS profile. Again, in case the PCRF is not deployed, the QoS is set locally by the PDN GW. This procedure is triggered every time QoS must be updated. QoS enforcement points are typically in PDN GW, eNodeB and UE.

It is worth mentioning that the procedures of FIGS. 2 and 3 are performed in the case QoS for a specific UE and bearer(s) needs to be updated. The signaling flow in FIG. 2 can be used to initially set a QoS profile and the signaling flow in FIG. 3 can be used to change the initial QoS profile to another QoS profile.

3GPP QoS is typically configured and managed from the PDN-GW, and supported by the PCRF, if deployed in the CN. When a traffic flow for a UE meets any criteria for updating its QoS treatment, an update of the present bearer QoS profile is done through the PCRF, and the bearer update is signaled to all the impacted network nodes, including the User Equipment (UE). A UE can have several bearers that all need to be updated. The amount of signaling can be significant depending on the number of bearers that need to be updated, and the number of, and frequency of users that require updated QoS.

In one example, a plurality of enterprise users enters or leaves an enterprise venue. The enterprise users may belong to a so called Closed Subscriber Group (CSG), for which there has been deployed dedicated base stations within the enterprise venue. Every time the enterprise users enters or leaves the enterprise venue, they will get updated QoS. The updating of QoS can produce large amounts of signaling. Additionally, a surrounding macro system, intended to serve any user outside the enterprise venue as well as non-enterprise users within the enterprise venue, may leak into the enterprise venue. Thus, additional handovers and QoS updates are provoked and additional signaling for QoS updates follows. The large amount of signaling may degrade performance of the EPS/LTE network.

SUMMARY

An object may be how to improve performance of a wireless communication system, such as the above mentioned EPS/LTE network.

According to an aspect, the object is achieved by a method, performed by a radio network node, for handling traffic on an Access Stratum (AS) bearer, wherein the Access Stratum bearer is capable of carrying the traffic between a first core network node and a wireless communication device. The radio network node receives, from a second core network node, an Access Stratum bearer request for setting up the Access Stratum bearer to carry traffic between the first core network node and the wireless communication device, wherein the Access Stratum bearer request includes a first AS Quality of Service (QoS) profile, a second AS QoS profile, and at least one criterion for applying the first or second AS QoS profile when processing the traffic. The radio network node processes the traffic while applying the first or second AS QoS profile based on whether or not one of the at least one criterion is fulfilled.

According to another aspect, the object is achieved by a method, performed by a first core network node, for handling traffic on a common bearer, wherein the common bearer is capable of carrying the traffic between the first core network node and a wireless communication device, wherein the first core network node manages at least one criterion for applying a first or a second common QoS profile when processing the traffic. The first core network node receives, from a second core network node, a common bearer request for setting up the common bearer to carry traffic between the first core network node and the wireless communication device, wherein the common bearer request includes a first common QoS profile, a second common QoS profile, and at least one criterion for applying the first or second common QoS profile when processing the traffic. The first core network node processes the traffic while applying the first or second common QoS profile.

According to a further aspect, the object is achieved by a method, performed by a second core network node, for managing a common bearer, wherein the common bearer is capable of carrying traffic between the first core network node and a wireless communication device. The second core network node obtains information about a first common QoS profile and a second common QoS profile and at least one criterion for applying a first or a second common QoS profile when processing the traffic. The second core network node sends, to the radio network node or the first core network node or the wireless communication device, a common bearer request for setting up the common bearer, wherein the common bearer request includes the first and second common QoS profiles, and the at least one criterion.

According to a still other aspect, the object is achieved by a method, performed by a wireless communication device, for handling traffic on a common bearer, wherein the common bearer is capable of carrying the traffic between the wireless communication device and a first core network node. The wireless communication device receives, from a radio network node or a second core network node, a common bearer request for setting up the common bearer and information relating to which of a first common QoS profile and a second common QoS profile to apply when processing the traffic. The common bearer request includes the first common QoS profile and the second common QoS profile. The wireless communication device processes the traffic while applying the first or second common QoS profile as derived from the information relating to which of the first and second common QoS profiles to apply when processing the traffic.

According to yet another aspect, the object is achieved by a radio network node for handling traffic on an AS bearer, wherein the AS bearer is capable of carrying the traffic between a first core network node and a wireless communication device. The radio network node is configured for receiving, from a second core network node, an Access Stratum bearer request for setting up the AS bearer to carry traffic between the first core network node and the wireless communication device, wherein the Access Stratum bearer request includes a first AS QoS profile, a second AS QoS profile, and at least one criterion for applying the first or second AS QoS profile when processing the traffic. Moreover, the radio network node is configured for processing the traffic while applying the first or second AS QoS profile based on whether or not one of the at least one criterion is fulfilled.

According to further aspect, the object is achieved by a first core network node for handling traffic on a common bearer, wherein the common bearer is capable of carrying the traffic between the first core network node and a wireless communication device, wherein the first core network node manages at least one criterion for applying a first or a second common QoS profile when processing the traffic. The first core network node is configured for receiving, from a second core network node, a common bearer request for setting up the common bearer to carry traffic between the first core network node and the wireless communication device, wherein the common bearer request includes a first common QoS profile, a second common QoS profile, and at least one criterion for applying the first or second common QoS profile when processing the traffic. Furthermore, the first core network node is configured for processing the traffic while applying the first or second common QoS profile.

According to a yet further aspect, the object is achieved by a second core network node for managing a common bearer, wherein the common bearer is capable of carrying traffic between the first core network node and a wireless communication device. The second core network node is configured for obtaining information about a first common QoS profile and a second common QoS profile and at least one criterion for applying a first or a second common QoS profile when processing the traffic. Moreover, the second core network node is configured for sending, to the radio network node or the first core network node or the wireless communication device, a common bearer request for setting up the common bearer, wherein the common bearer request includes the first and second common QoS profiles, and the at least one criterion.

According to a still further aspect, the object is achieved by a wireless communication device for handling traffic on a common bearer, wherein the common bearer is capable of carrying the traffic between the wireless communication device and a first core network node. The wireless communication device is configured for receiving, from a radio network node or a second core network node, a common bearer request for setting up the common bearer and information relating to which of a first common QoS profile and a second common QoS profile to apply when processing the traffic. The common bearer request includes the first common QoS profile and the second common QoS profile. Additionally, the wireless communication device is configured for processing the traffic while applying the first or second common QoS profile as derived from the information relating to which of the first and second common QoS profiles to apply when processing the traffic.

The common bearer request may comprise the NAS bearer request or the AS bearer request. Thanks to that the common bearer request includes the first common QoS profile, the second common QoS profile, and at least one criterion for applying the first or second common QoS profile when processing the traffic, a node capable of enforcing QoS profiles is made aware of two possible QoS profiles. The node may be the radio network node, the first core network node and/or the wireless communication device. The node thus applies the first or second common QoS profile based on the at least one criterion. For example, if the at least one criterion is fulfilled, the node may apply the first common QoS profile when processing the traffic carried by the common bearer and if the at least one criterion is not fulfilled, the node may apply the second common QoS profile when processing the traffic carried by the common bearer.

In one example, the second core network node, such as a PCRF, configures and keeps track of the first and second common QoS profiles for each common bearer. This means that the second core network node handles two parallel common QoS profiles. In other examples, the second core network node may of course handle two or more parallel common QoS profiles. All common QoS profiles, such as the first and second common QoS profiles, are signaled, by the second core network node to the first core network node, when setting up the common bearer. The common QoS profiles, and/or QoS profiles derived therefrom, are propagated to each node capable of enforcing QoS profiles. As mentioned above, each node selects an appropriate QoS profile based on the at least one criterion without further interaction with the second core network node. Since no further interaction with the second core network node is required to change the common QoS profile, signaling to and/or from the second core network node is reduced.

In some examples, the at least one criterion may specify an identity for radio network nodes. Returning to the example in the background section, the at least one criterion may thus specify the identity for one or more radio network nodes located within the enterprise venue. The one or more radio network nodes, or base stations, may be comprised in an in-door radio communication system for the enterprise venue.

In this manner, e.g. the wireless communication device or the radio network node may select the first or second common QoS profile depending on the identity of the radio network node, to which the wireless communication device is connected. The wireless communication device may be served by the radio network node. In a similar manner, the first and/or second core network nodes may keep track of subscriber identities to serve members of a certain group, such as Closed Subscriber Group, according to the first or second common QoS profile.

In further examples, the at least one criterion may specify an identity for services generating the traffic. For example, the criterion may specify an identity for Voice over IP (VoIP) services, which thus obtains prioritized treatment, in e.g. the radio network node, the first core network node or the wireless communication device, as compared to e.g. downloading of a file.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1:
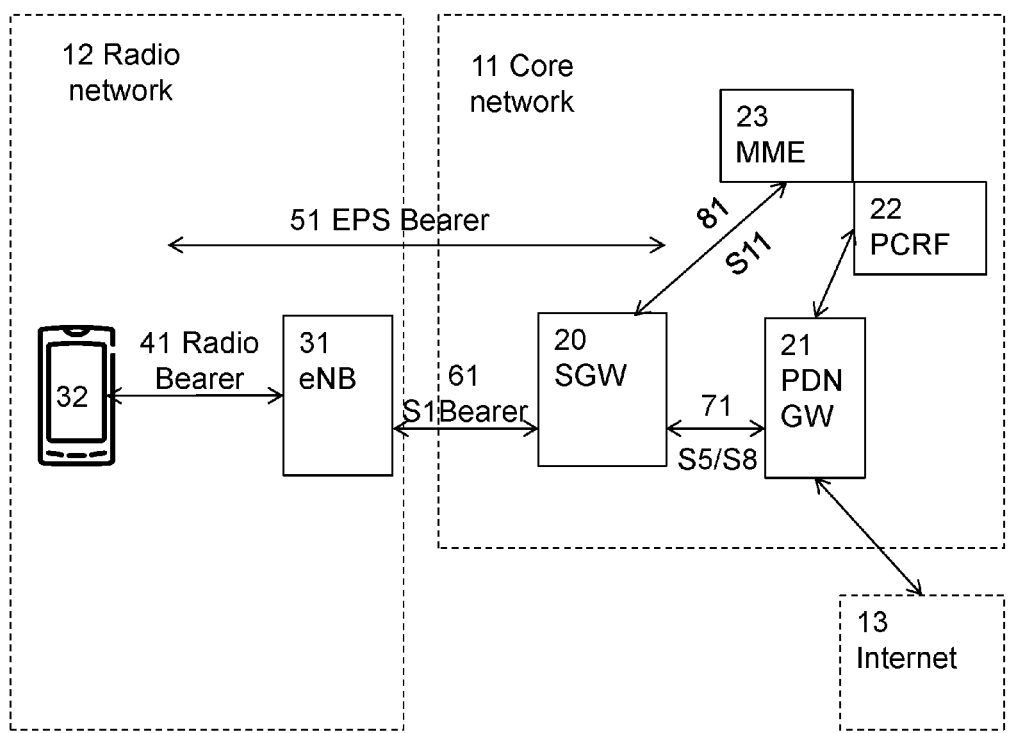
FIG. 1 is a schematic overview of a Long Term Evolution/Evolved Packet Core (EPC) system according to prior art.

Throughout the following description similar reference numerals have been used to denote similar features, such as nodes, actions, steps, modules, circuits, parts, items elements, units or the like, when applicable. In the Figures, features that appear in some embodiments are indicated by dashed lines.

Figure 4:
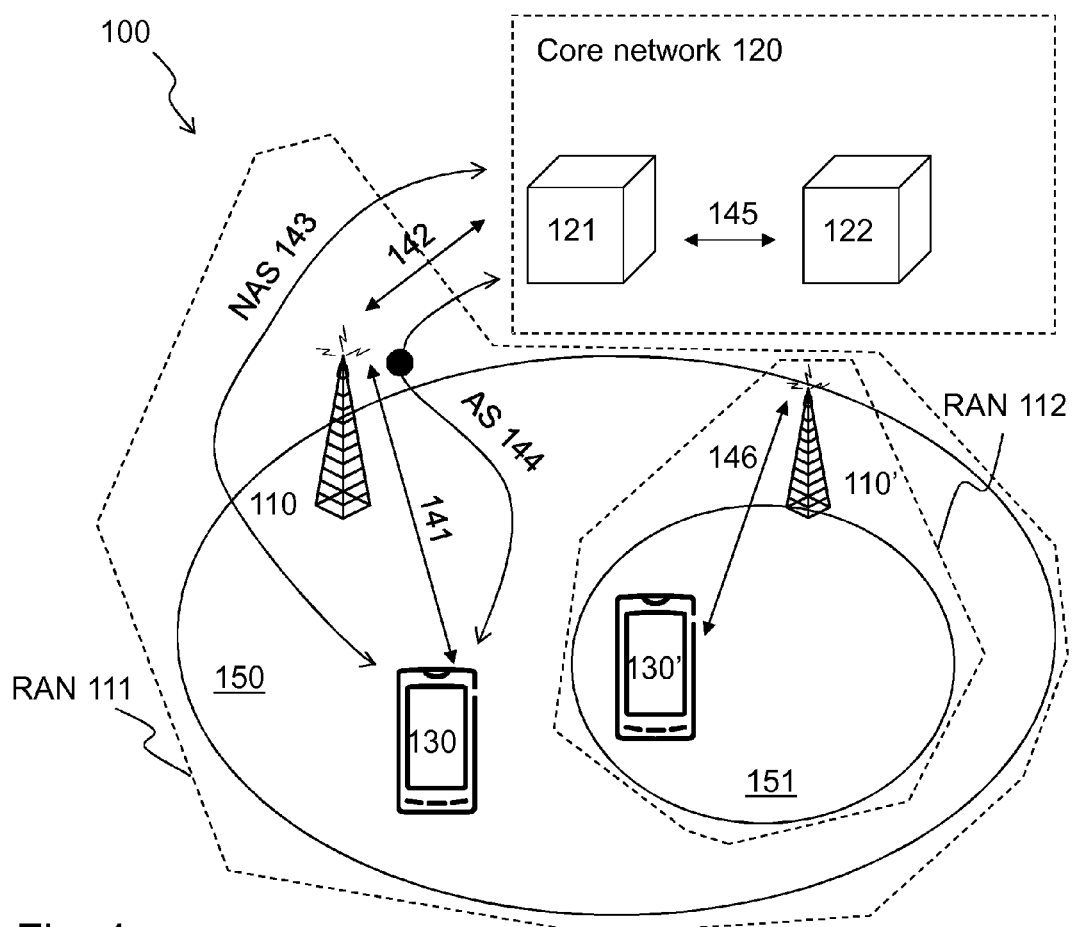
FIG. 4 is an overview of an exemplifying radio communication system in which embodiments herein may be implemented.

FIG. 4 depicts an exemplifying communication system 100 in which embodiments herein may be implemented. In this example, the communication system 100 is an LTE/EPC system. In other examples, the communication network 100 may be any cellular or wireless communication system, such as a Global System for Mobile Communications (GSM), Universal Mobile Telecommunication System (UMTS) and Worldwide Interoperability for Microwave Access (Wi-MAX) or the like.

The communication network 100 may comprise a Radio Access Network (RAN) 111. The RAN 111 may be any known radio access technology, such as a RAN from the 3GPP standard suite of technologies, WiMax, WiFi or similar.

The RAN 111 comprises a radio network node 110. As used herein, the term "radio network node" may refer to an evolved Node B (eNB), a Home eNB (HeNB), a Radio Network Controller (RNC), a Radio Base Station (RBS), a control node controlling one or more Remote Radio Units (RRUs), an access point or the like.

Moreover, the communication network 100 may comprise a further RAN 112. The RAN 112 may be any known radio access technology, such as a RAN from the 3GPP standard suite of technologies, WiMax, WiFi or similar. The further RAN 112 comprises a further radio network node 110'.

Furthermore, the communication network 100 may comprise a core network 120. The core network may handle back-end functions, such as subscriber information, location register, mobility functions, policy and charging functions and the like.

The core network 120 comprises a first core network node 121 and a second core network node 122. In case of EPS/LTE, the first core network node 121 may be a Serving GateWay (SGW), a PDN GW or the like, and the second core network node 122 may be a PCRF, a Mobility Management Entity (MME), Home Subscriber System (HSS) or the like. Additionally, the second core network node 122 may also be a PDN GW. This means that the PDN GW may take the role of both the first core network node 121 and/or the second core network node 122.

Moreover, FIG. 4 illustrates a wireless communication device 130. This means that the wireless communication device 130 is present in the RAN 111. The communication network 100 may be said to comprise the wireless communication device 130.

The radio network node 110 may be connected to the wireless communication device 130 via a radio bearer 141. The radio bearer 141 may carry traffic, e.g. transmissions, to and/or from the radio network node 110. The traffic may include user data, such as payload data, content data etc., and/or control data, such as scheduling, authentication and mobility information.

Similarly, the radio network node 110 may be connected to the first core network node 121 via an S1 bearer 142 in case of EPS/LTE. Again, the S1 bearer 142 may carry traffic, e.g. transmissions, to and/or from the radio network node 110. The traffic may include user data, such as payload data, content data etc., and/or control data, such as scheduling, authentication and mobility information.

An Non-Access Stratum (NAS) bearer 143, such as an EPS bearer in case of EPS/LTE, may directly connect the wireless communication device 130 to the first core network node 121.

Moreover, the wireless communication device 130 may be connected to the first core network node 121 via the radio network node 110 by an Access Stratum (AS) bearer 144, such as an E-RAB in case of EPS/LTE.

As used herein, the term "common bearer" refers to the NAS bearer 143 and/or the AS bearer 144.

The first core network node 121 may be connected to the second core network node 122 by via an S5/S8 interface, in case of LTE/EPC when the first core network node 121 is a SGW and the second core network node 122 is a PGW.

In a further example, the first core network node 121 is a SGW and the second core network node 122 is an MME. In this example, communication between the first and second core network nodes 121, 122 is performed via an S11 interface for the case of LTE.

As used herein, the term "wireless communication device" may refer to a user equipment, a wireless device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic or electric switch, a microphone, a loudspeaker, a camera sensor etc. The term "user", or "subscriber", may indirectly refer to the wireless communication device. Sometimes, the term "user" may be used to refer to the user equipment or the like as above. It shall be understood that the user may not necessarily involve a human user. The term "user" may also refer to a machine, a software component or the like using certain functions, methods and similar.

Figure 5:
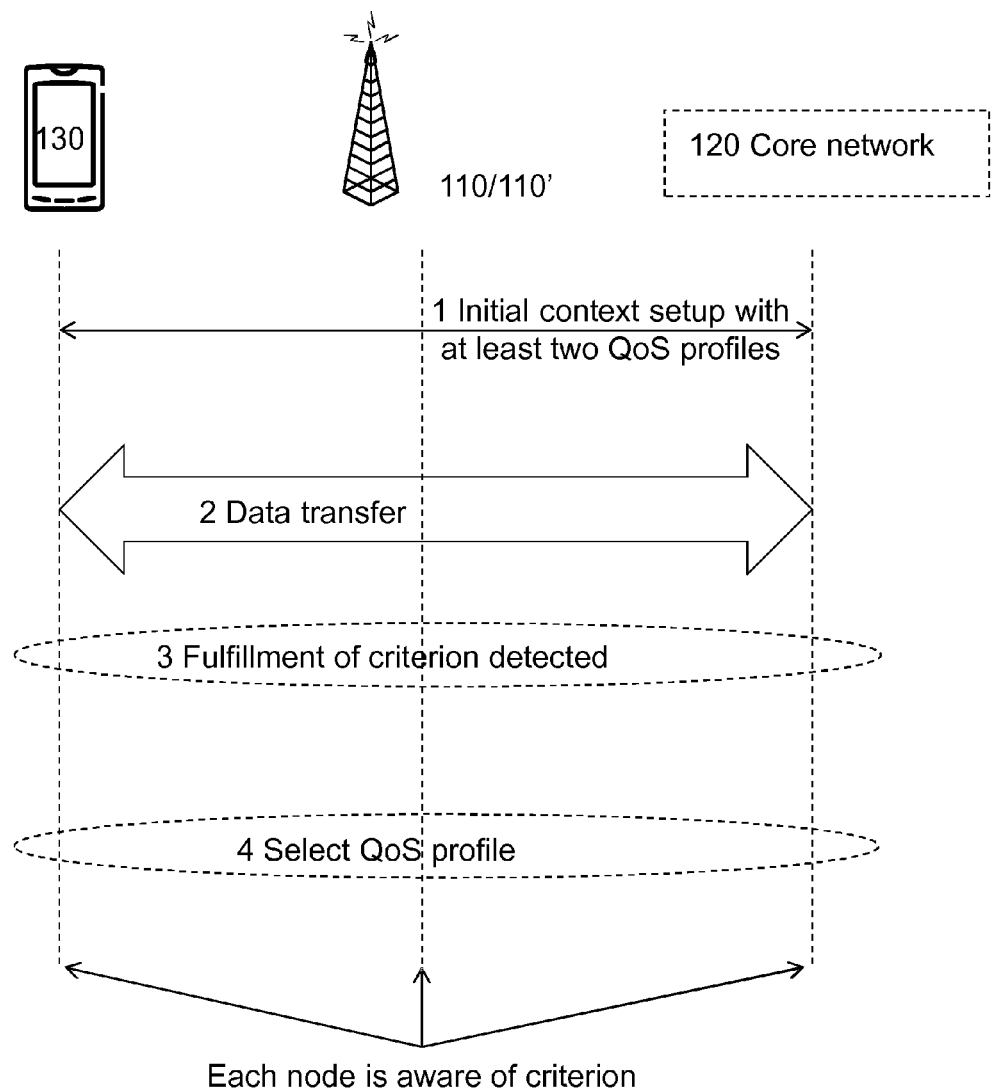
FIG. 5 is a combined signaling and flowchart illustrating one example method according to embodiments herein.

FIG. 5 illustrates one example embodiment, which may be implemented in the communication system 100 of FIG. 4. In FIG. 5, the radio network node 110 represents the RAN 111, the radio network node 110' represents RAN 112 and the first and/or second core network nodes 121, 122 are represented by the core network 120. In particular, this means that the RAN 111 may be a macro system and the RAN 112 may be an indoor system providing coverage within a building or the like.

The following actions may be performed.

Action 1

The wireless communication device 130 or the core network 120 may initiate an initial context setup. In this manner, e.g. an AS bearer may be set up between the core network 120 and the wireless communication device 130. The AS bearer is associated with a first AS QoS and a second AS QoS where a criterion determines which of the first and second AS QoS profile to apply when processing traffic on the AS bearer. Hence, the core network 120, such as an PCRF or PGW or MME, sets up the AS bearer with two QoS profiles, i.e. the first and second QoS profiles.

In this example, the criterion may specify an identity for radio network nodes. This may mean that when the wireless communication device 130 is served by the radio network node 110', which is specified by the criterion, the first AS QoS profile shall be applied, and otherwise, i.e. when the wireless communication device 130 is served by any other radio network node, the second AS QoS profile shall be applied.

Action 2

Once the AS bearer has been established, the AS bearer may carry traffic to and/or from the core network 120. The traffic passes via the radio network node 110, which is capable of inspecting and analyzing the traffic. At this stage, the second AS QoS profile may be applied.

Action 3

Fulfillment of the criterion may be detected, e.g. due to mobility of the wireless communication device. In this example, the criterion is detected by the radio network 110' when the wireless communication device 130 is brought into a building equipped with an in-door radio communication system. The AS bearer is thus moved to the radio network node 110'. Then, the radio network node 110' detects that the first AS QoS profile shall be applied, since the identity specified by the criterion is equal to an identity of the radio network node that currently serves the wireless communication device.

Action 4

Accordingly, the radio network node 110' selects and uses the first AS QoS profile, when processing traffic carried by the AS bearer between the first core network node and the wireless communication device 130. Typically, the radio network node 110 applies the first AS QoS profile to traffic towards the first core network node 121, i.e. uplink, and towards the wireless communication device 130, i.e. downlink.

Figure 2:
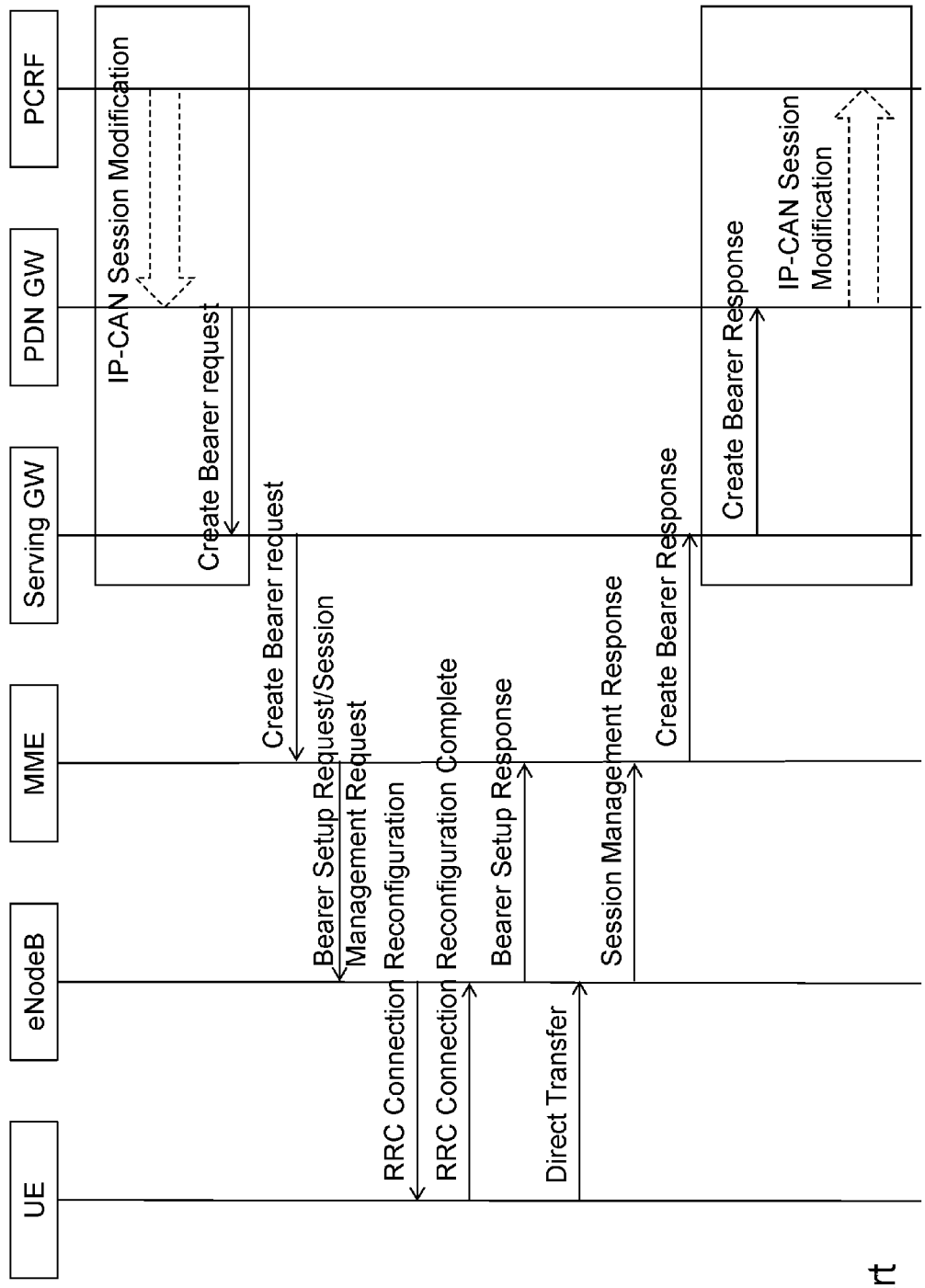
FIG. 2 is a combined signaling and flowchart illustrating a bearer activation procedure according to prior art.
Figure 3:
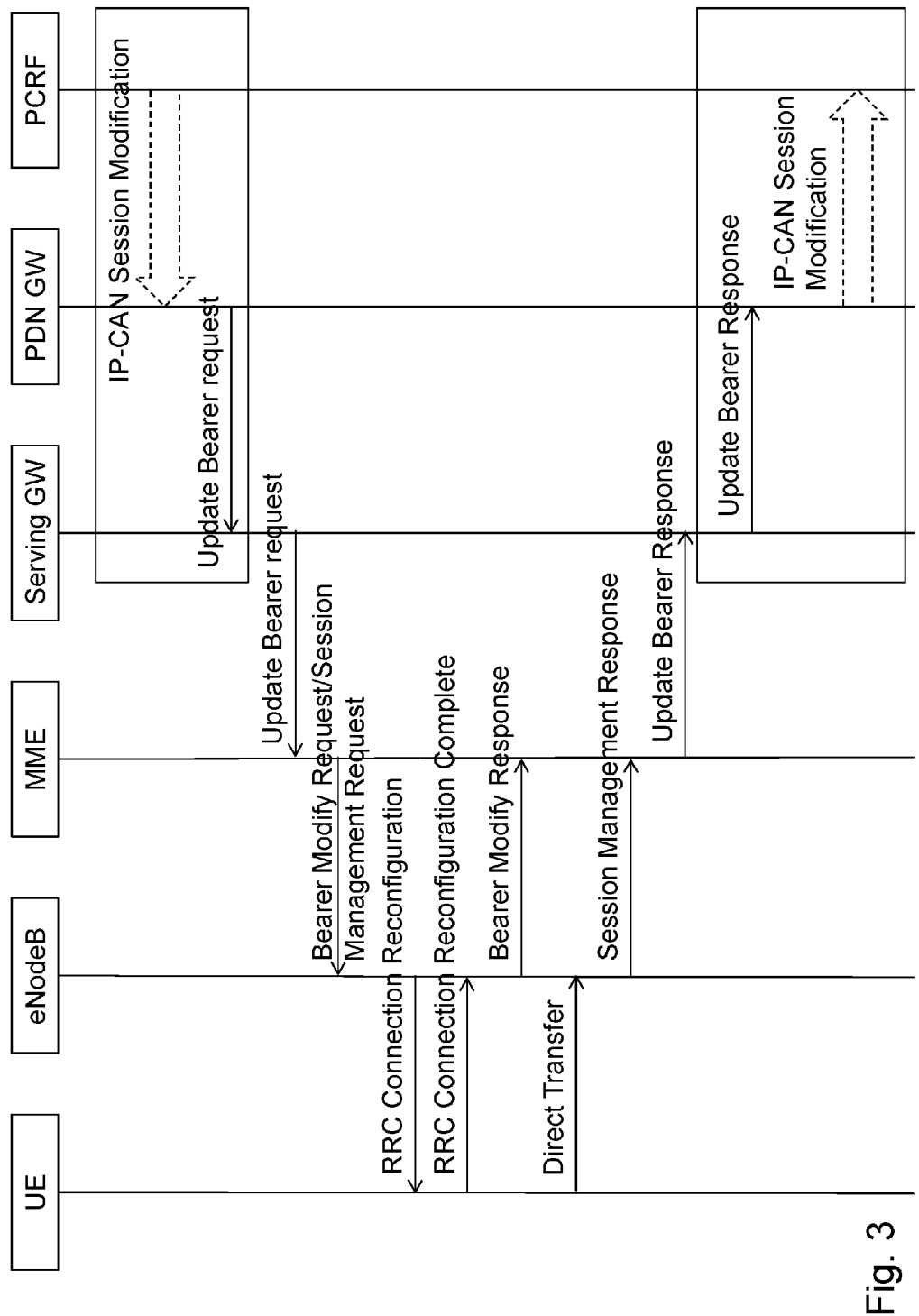
FIG. 3 is a combined signaling and flowchart illustrating a bearer modification procedure according to prior art.

An advantage is that the handling of the first and second AS QoS profile is performed locally by the radio network node 110'. This means that there is no need to update, or modify, the AS bearer. Such updating or modification would normally require signaling from the second core network node towards the first core network node, the radio network node, the wireless communication device and back again, as illustrated in FIGS. 2 and/or 3.

In the example, above the radio network node makes use of its knowledge about the criterion. In other examples, the core network 120 and/or the wireless communication device 130 may also be aware of the criterion. Thus, the core network 120 and/or the wireless communication device 130 may also detect and subsequently select and apply, to the downlink and uplink, respectively, a certain QoS profile based on e.g. the detection of the fulfilled criterion. In other examples illustrated below in actions A052, B042, C032 and/or D045, the radio network node 110, the first core network node 121 and/or the wireless communication device 130 may be informed about whether or not the criterion is fulfilled.

Figure 6:
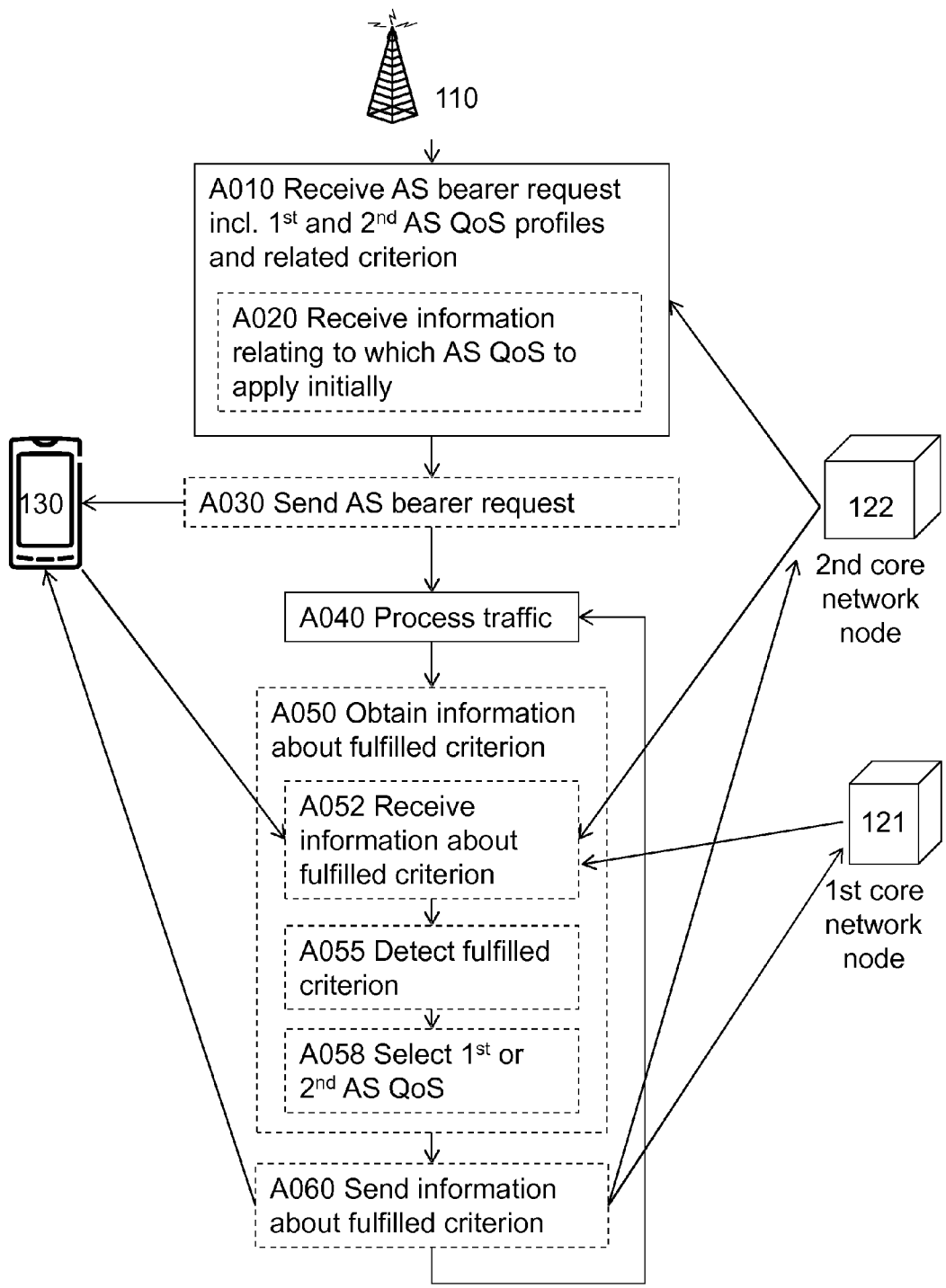
FIG. 6 is a flowchart illustrating embodiments of the method in the radio network node.

In FIG. 6, a schematic flowchart of exemplifying methods in the radio network node 110 is shown. Accordingly, the radio network node 110 performs a method for handling traffic on an AS bearer. The AS bearer is capable of carrying the traffic between the first core network node 121 and the wireless communication device 130.

One or more of the following actions may be performed in any suitable order.

Initially, there may be downlink data available to send towards the wireless communication device 130 or there may be uplink data available to send towards the first core network node. Thus, a common bearer may need to be established. In relation to the exemplifying methods, performed by the radio network node 110, the common bearer is an AS bearer.

Action A010

Therefore, the radio network node 110 receives, from the second core network node 122, an Access Stratum bearer request for setting up the Access Stratum bearer to carry traffic between the first core network node 121 and the wireless communication device 130. The Access Stratum bearer request includes a first AS QoS profile, a second AS QoS profile, and at least one criterion for applying the first or second AS QoS profile when processing the traffic. In other examples, the AS bearer request may include a third AS QoS profile, a fourth AS QoS profile etc. as appropriate depending on scenario. As the number of profiles to apply increase a corresponding increase of criteria may apply. Hence, as one example if there are N QoS profiles there may be N criteria, or N/2, if considering each criteria as a boolean value indicating one of a pair of QoS profiles for true and another one of the pair of QoS profiles for false.

In some examples, the first AS QoS profile, the second AS QoS profile and the at least one criterion are received in one or more separate messages, such as S1AP signalling and messages between the radio network node and the MME in case of LTE. Examples of S1AP messages are INITIAL CONTEXT SETUP REQUEST, UE CONTEXT MODIFICATION REQUEST, DOWNLINK NAS TRANSPORT and HANDOVER REQUEST etc.

The at least one criterion may specify one or more of:
an identity for radio network nodes,
an identity for radio network cells,
an identity for closed subscriber groups,
a membership of a closed subscriber group,
an identity for identifying packets of the traffic, the identity being associated with the first or second AS QoS profile,
an identity for applications generating the traffic, and
an identity for services generating the traffic.

The identity for radio network nodes may be a base station identity, such as eNB Identity, i.e. any identity known to the RAN.

The identity for radio network cells may be Cell ID, etc.

The identity for closed subscriber groups may be a CSG identity, etc.

The membership of a closed subscriber group may be a binary, or Boolean, value, wherein a value of 1, or true, indicates that the wireless communication device has a membership in any closed subscriber group, i.e. an non-identified CSG group, and a value of 0, or false, indicates that the wireless communication device has not a membership in any closed subscriber group.

The identity for identifying packets of the traffic may be realized by means of packet marking. For example, a field of a header of a packer may be used to identify packets of the traffic. A first value of the field may be associated to the first AS QoS profile and a second value of the field may be associated to the second AS QoS profile. This means that the identity is associated with the first or second AS QoS profile.

The identity for applications generating the traffic may refer to identities for a specific software application, such as Skype, Hangouts, FaceTime, etc.

The identity for services generating the traffic may indicate real-time services, such as VoIP, video conference applications, and non-real-time services, such as File Transfer Protocol applications, etc. The identities for services may be include any number of groups of services, where each group may be defined by a required QoS.

Action A020

The radio network node 110 may receive configuration information relating to which of the first and second AS QoS profile to apply initially. In some examples, the configuration information may be included in the AS bearer request. In other examples, the configuration information may be provided as a message, such as an RRC message or S1AP message, that is separated from the AS bearer request.

Action A030

The radio network node 110 may send the AS bearer request to the wireless communication device 130. This may mean that the radio network node derives a so called RRC Connection Reconfiguration message from the AS bearer request. This action includes handling of signalling related to establishment of the NAS-bearer, by use of NAS level signalling, and the radio bearer, by use of RRC signalling.

It shall here be noted that action A040 is performed repeatedly. Moreover, one or more of actions A050 through A060 may be performed before action A040 for each time action A040 is performed.

Action A040

Now that the radio network node 110 is aware of the at least one criterion and the first and second AS QoS profiles, the radio network node 110 processes the traffic while applying the first or second AS QoS profile based on the at least one criterion.

This means that the radio network node applies the first or second AS QoS profile based on whether or not the at least one criterion is fulfilled. When the criterion is fulfilled, the radio network node 110 may process the traffic while applying the first QoS profile, which thus is defined to be applied when the criterion is fulfilled. Similarly, when the criterion is non-fulfilled, the radio network node 110 may process the traffic while applying the second QoS profile, which thus is defined to be applied when the criterion is non-fulfilled. Expressed differently, the first QoS profile may be associated with that the criterion is fulfilled, and the second QoS profile may be associated with that the criterion is not fulfilled. Hence, the radio network node 110 applies the QoS profile as associated with the fulfilled or non-fulfilled criterion.

In one example, the at least one criterion may specify an identity for closed subscriber groups. In more detail, the processing of the traffic may mean that the first QoS profile is applied when the wireless communication device 130 belongs to a closed subscriber group having a specific identity which is equal to the identity specified by the at least one criterion. Accordingly, the at least one criterion is fulfilled when the identity, specified by the at least one criterion, is equal to the specific identity.

In another example, the at least one criterion may specify an identity for services generating the traffic. In more detail, the processing of the traffic may that the first QoS profile is applied when the radio network node has detected, e.g. by inspection of packets in the traffic, as in action A055 below, that a specific identity of the service generating the traffic is equal to the identity specified by the at least one criterion. Accordingly, the at least one criterion is fulfilled when the identity, specified by the at least one criterion, is equal to the specific identity.

In another example, the at least one criterion may specify a traffic or signalling behaviour for services generating the traffic. In more detail, the processing of the traffic may that the first QoS profile is applied when the radio network node has detected, e.g. by inspection of packets in the traffic, as in action A055 below, that a specific traffic or signalling behaviour of the service generating the traffic is equal to the traffic or signalling behaviour specified by the at least one criterion. Accordingly, the at least one criterion is fulfilled when the traffic or signalling behaviour, specified by the at least one criterion, is equal to the specific traffic or signalling behaviour.

In another example, the at least one criterion may specify a data volume of transmitted traffic. In more detail, the processing of the traffic may that the first QoS profile is applied when the radio network node has detected, e.g. by inspection of packets in the traffic, as in action A055 below, that a specific data volume of transmitted traffic is equal to the data volume of transmitted traffic specified by the at least one criterion. Accordingly, the at least one criterion is fulfilled when the data volume of transmitted traffic, specified by the at least one criterion, is equal to the specific data volume of transmitted traffic.

Action A050

The radio network node 110 may obtain information indicating fulfillment of one of the at least one criterion. Typically, the radio network node 110 obtains the information when there has been a change, e.g. one or more of the at least one criterion changes from being fulfilled to non-fulfilled.

Action A052

In some examples, the obtaining A050 may comprise receiving, from the first core network node 121 or the from second core network node 122 or from the wireless communication device 130, the information indicating fulfillment of one of the at least one criterion. This means that the radio network node 110 receives the information indicating fulfillment of one of the at least one criterion from a node that has detected the change of the at least one criterion. The node may thus be the first core network node 121, the second core network node 122 or the wireless communication device 130.

Action A055

In some examples, the obtaining A050 may comprise detecting fulfillment of one of the at least one criterion, thereby generating the information indicating fulfillment of one of the at least one criterion. In contrast to action A052, this means that the radio network node 110 itself is able to detect, or determine, whether or not the at least one criterion is fulfilled.

Action A058

Thanks to action A050 the radio network node 110 is aware of whether or not the at least one criterion is fulfilled. Thus, the radio network node 110 may select the first or second AS QoS profile based on the information indicating fulfillment of one of the at least one criterion.

In relation to the repetition of action A040, it may be said that after action A058 may have been performed, action A040 may be performed while using the selected AS QoS profile. In this context, as mentioned, it may be noted that action A040 is performed repeatedly, before and/or after one or more of actions A050 through A060.

Action A060

Typically, when action A055 has been performed, the radio network node 110 may send, to the first core network node 121 or to the second core network node 122 or to the wireless communication device 130, the information indicating fulfillment of one of the at least one criterion. The information indicating fulfillment of one of the at least one criterion may be said to be derived from action A055. Action A060 thus enables the information to be spread throughout the communication system 100.

Figure 7:
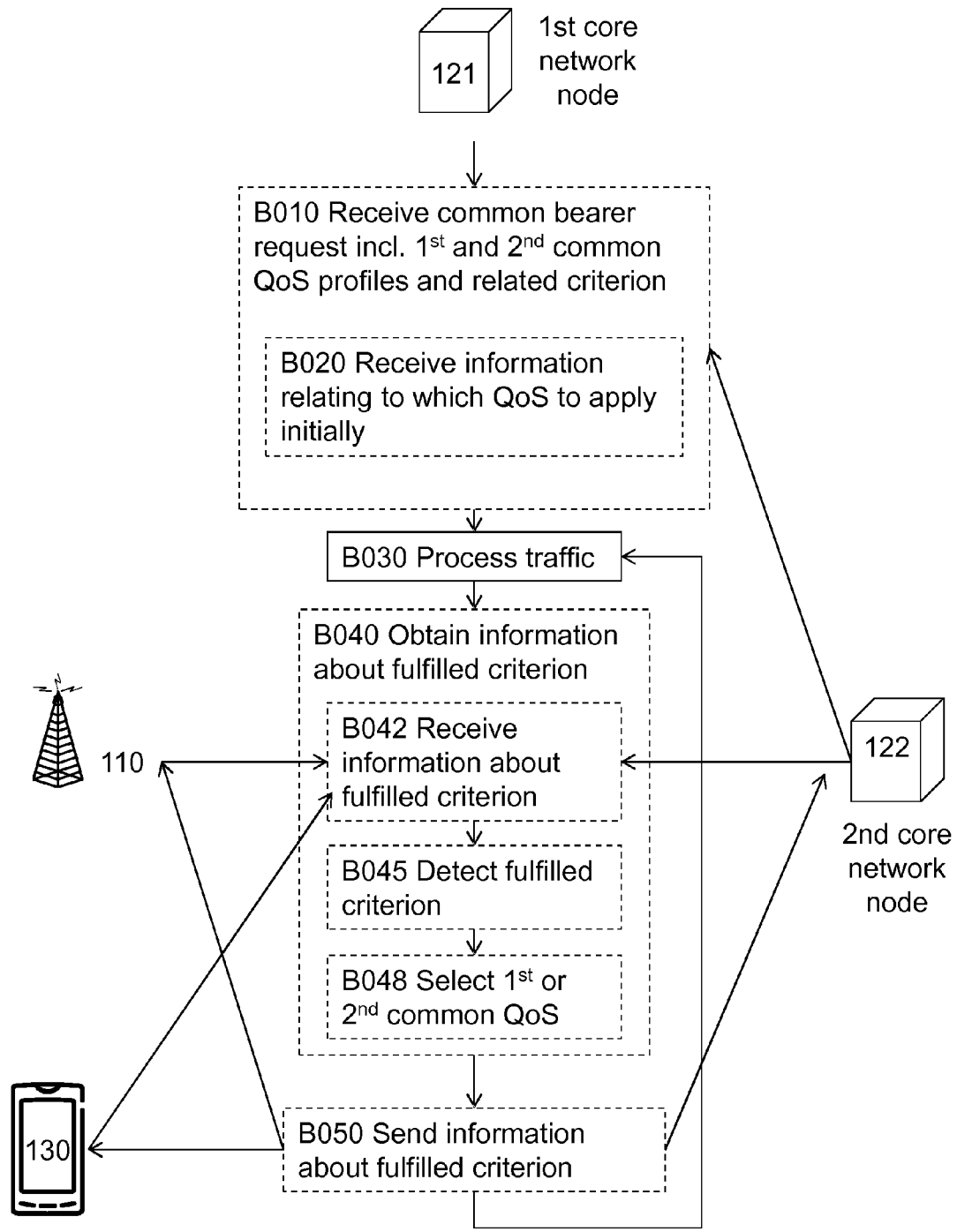
FIG. 7 is a flowchart illustrating embodiments of the method in the first core network node.
Figure 8:
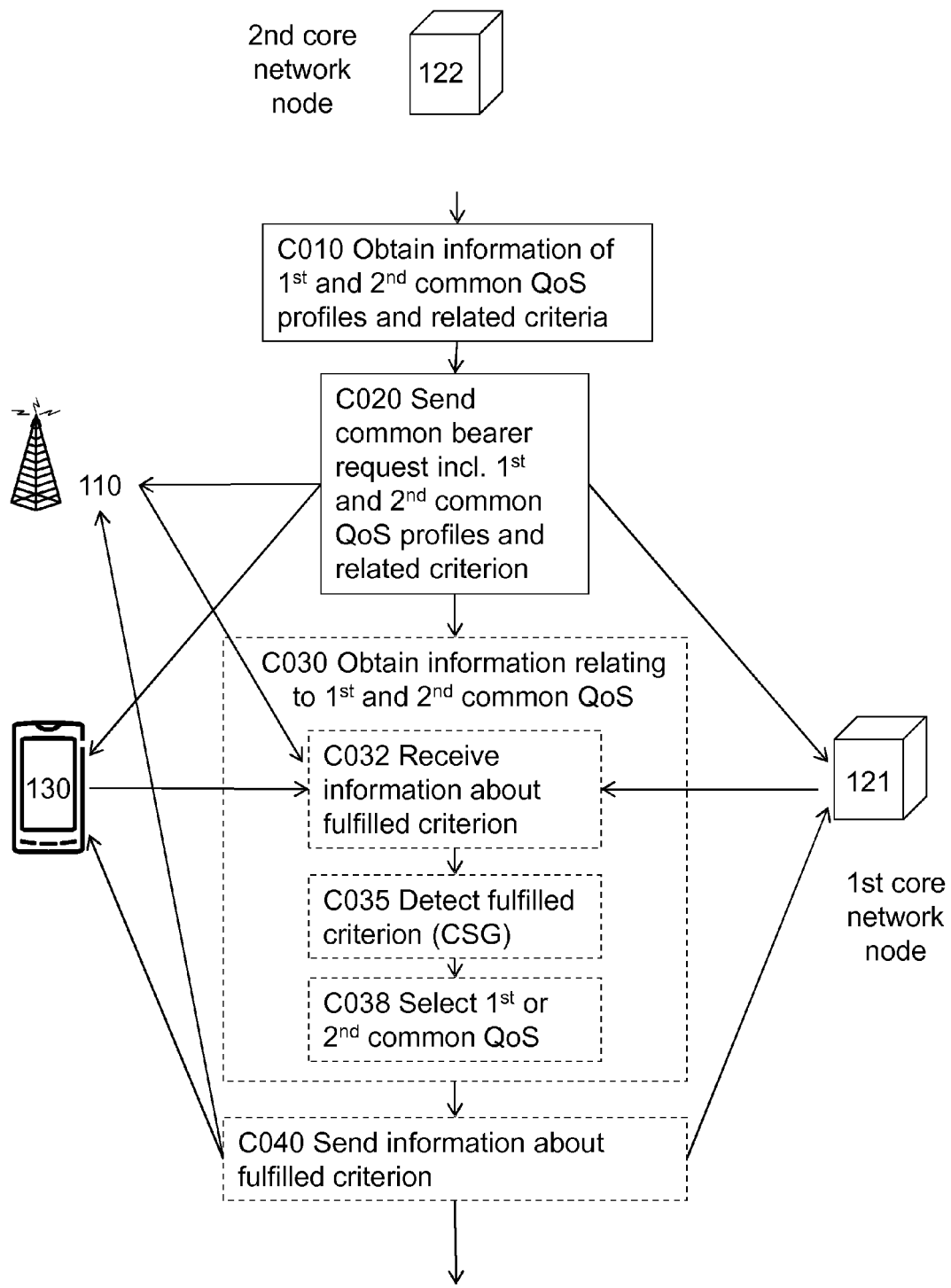
FIG. 8 is a flowchart illustrating embodiments of the method in the second core network node.

In FIGS. 7 and 8, exemplifying methods in the core network 120 are shown. FIG. 7 illustrates exemplifying methods in the first core network node 121, i.e. in a user plane. The user plane refers to bearers carrying traffic, including user data, payload, content data, etc. FIG. 8 illustrates exemplifying methods in the second core network node 122, i.e. in a control plane. The control plane refers to bearers carrying traffic, including control information, such as mobility information, location information, subscriber information etc.

In FIG. 7, a schematic flowchart of exemplifying methods in the first core network node 121 is shown. Accordingly, the first core network node 121 performs a method for handling traffic on a common bearer. The common bearer is capable of carrying the traffic between the first core network node 121 and the wireless communication device 130. The first core network node 121 manages the at least one criterion for applying a first or a second common QoS profile when processing the traffic.

One or more of the following actions may be performed in any suitable order.

Action B010

In order to establish a common bearer, the first core network node 121 receives, from a second core network node 122, a common bearer request for setting up the common bearer to carry traffic between the first core network node 121 and the wireless communication device 130. The common bearer request includes a first common QoS profile, a second common QoS profile, and at least one criterion for applying the first or second common QoS profile when processing the traffic.

Similarly to action A010, the common bearer request may include a third common QoS profile, a fourth common QoS profile etc. as appropriate depending on scenario. As mentioned above, the number of criteria may increase as number of common QoS profiles increase.

In some examples, the first common QoS profile, the second common QoS profile and the at least one criterion are received in one or more separate messages, e.g. received over a Gx-interface between the PCRF and PDN GW, or a GTP-C protocol based interface in case of LTE, such as the S5 and S11 interfaces.

Action B020

The first core network node 121 may receive information relating to which QoS to apply initially. In this example, the first core network node 121 receives this information explicitly. In other examples, the first core network node 121 may apply the QoS that is received first initially, even when two QoS profiles are received in one and the same message.

Action B030

The first core network node 121 processes the traffic while applying the first or second common QoS profile.

As mentioned above, the at least one criterion may specify one or more of:
- an identity for radio network nodes,
- an identity for radio network cells,
- an identity for closed subscriber groups,
- a membership of a closed subscriber group,
- an identity for identifying packets of the traffic, the identity being associated with the first or second common QoS profile,
- an identity for applications generating the traffic, and
- an identity for services generating the traffic.

It shall here be noted that the following criteria may be detected locally by the first core network node 121:
- an identity for radio network nodes,
- an identity for radio network cells,
- an identity for identifying packets of the traffic, the identity being associated with the first or second common QoS profile,
- an identity for applications generating the traffic, and
- an identity for services generating the traffic.

Action B040

The first core network node 121 may obtain information relating to which of the first and second common QoS profiles to apply when processing the traffic.

When action B040 has been performed, the first core network node 121 may process the traffic while applying the first or second common Quality of Service profile based on the obtained information.

Action B042

In some examples, the obtaining B040 of the information relating to which of the first and second common QoS profiles to apply may comprise receiving, from the radio network node 110 or the second core network node 122 or the wireless communication device 130, the information indicating fulfillment of one of the at least one criterion. In these examples, this may mean that the information relating to which of the first and second common QoS profiles to apply is embodied in the form of the information indicating fulfillment of one of the at least one criterion.

In this manner, the first core network node 121 may be informed about fulfillment of the at least one criterion, e.g. when any one of the radio network node 110, the second core network node 122 and the wireless communication device 130 has detected, such as generated, the information indicating fulfillment of one of the at least one criterion.

In action A055 above, the radio network node 110 has detected fulfillment of the at least one criterion and subsequently generated and sent the information indicating fulfillment thereof.

In action C035 below, the second core network node 122 has detected fulfillment of the at least one criterion and subsequently generated and sent the information indicating fulfillment thereof.

In action D042 below, the wireless communication device 130 has detected fulfillment of the at least one criterion and subsequently generated and sent the information indicating fulfillment thereof.

Action B045

In some examples, the obtaining B040 of the information relating to which of the first and second common QoS profiles to apply may comprise detecting fulfillment of one of the at least one criterion. In this manner, the information indicating fulfillment of one of the at least one criterion may be generated.

Accordingly, the first core network node 121 may detect by itself and subsequently generate the information indicating fulfillment of one of the at least one criterion.

Action B048

Thanks to that the first core network node 121 has obtained the information indicating fulfillment of one of the at least one criterion according to one or more of actions B040, B042 and B045, the first core network node 121 may select the first or second common QoS profile based on the information indicating fulfillment of one of the at least one criterion.

Action B050

Typically, when action B045 has been performed, the first core network node 121 may send, to the wireless communication device 130 or the radio network node 110 or the second core network node 122, the information indicating fulfillment of one of the at least one criterion. The information indicating fulfillment of one of the at least one criterion may be said to be derived from action B045. Action B050 thus enables the information to be spread throughout the communication system 100. This means that the first core network node 121 performs actions similar to those performed by the radio network node in action A060.

After action B048 may have been performed, action B030 may be performed while using the selected common QoS profile. In this context, it may be noted that action B030 is performed repeatedly, before and/or after one or more of actions B040 through B050.

With the method of FIG. 7, the common bearer may be an AS bearer for carrying the traffic via a radio network node 110 at Access Stratum level. The Access Stratum level refers to that the radio network node 110 may be able to interpret and process the traffic passing therethrough. The common bearer request may be an AS bearer request sent to the radio network node 110. The first common QoS profile may comprise a first AS QoS profile relating to the AS bearer and the second QoS profile may comprise a second AS QoS profile relating to the AS bearer. Hence, in these cases, the method handles traffic on the AS bearer.

Similarly, in some case, the common bearer may be a NAS bearer for carrying the traffic via a radio network node 110 at Non-Access Stratum level. The Non-Access Stratum level refers to that the radio network node 110 may be unable to interpret and process the traffic passing therethrough. The bearer request may be an NAS bearer request sent to the wireless communication device 130, wherein the first common QoS profile may comprise a first NAS QoS profile relating to the NAS bearer and the second common QoS profile may comprise a second NAS QoS profile relating to the AS bearer. Therefore, the method handles traffic on the NAS bearer.

Additionally, in the context of the first core network node 121, the common bearer relate to a S5/S8 interface for carrying the control information between the first core network node 121, such as an SGW, and the second core network node 122, such as a PGW. Accordingly, also the S5/S8 interface may be associated with two different QoS profiles.

In FIG. 8, a schematic flowchart of exemplifying methods in the second core network node 122 is shown. Accordingly, the second core network node 122 performs a method for managing a common bearer. The common bearer is capable of carrying traffic between the first core network node 121 and the wireless communication device 130. The second core network node 122, such as an PGW, handles bearers in the control plane as mentioned above.

One or more of the following actions may be performed in any suitable order.

Action C010

In order to initially configure the communication system 100, the second core network node 122 obtains information about a first common QoS profile and a second common QoS profile and at least one criterion for applying a first common QoS profile or a second common QoS profile when processing the traffic. The at least one criterion may be managed by any one of the radio network node 110, the first core network node 121 and the wireless communication device 130. See for example actions A055, B045 and/or D042.

As an example, the second core network node 122 may receive the information about the first and second common QoS profile from the first core network node 121 (in case of PDN-GW to MME or SGW), or another second core network node (in case of DPI node to PCRF).

Moreover, this initial configuration may be pre-configured into the PCRF, the PGW, or the MME. In case of the MME, the initial configuration may be received from a Home Location Register (HLR) or a Home Subscriber System (HSS).

Action C020

The second core network node 122 sends, to the radio network node 110 or the first core network node 121 or the wireless communication device 130, a common bearer request for setting up the common bearer. The common bearer request includes the first and second common QoS profiles, and the at least one criterion.

As a result, the second core network node 122 ensures that the first and second common QoS profiles, and the at least one criterion are propagated throughout the communication network 100.

Action C030

The second core network node 122 may obtain information relating to which of the first and second common QoS profiles to be applied when the traffic is processed by the first core network node 121, the wireless communication device 130 or a radio network node 110. The information may be obtained in various manner as explained in action C032 and C035.

Action C032

The obtaining C030 of the information relating to which of the first and second common QoS profiles to apply may comprise receiving, from the radio network node 110 or the first core network node 121 or the wireless communication device 130, information indicating fulfillment of one of the at least one criterion. In this action, it may be that the information relating to which of the first and second common QoS profiles to apply is embodied in the form of the information indicating fulfillment of one of the at least one criterion.

In this manner, the second core network node 122 may be informed about fulfillment of the at least one criterion, e.g. when any one of the radio network node 110, the first core network node 121 and the wireless communication device 130 has detected, such as generated, the information indicating fulfillment of one of the at least one criterion.

In action A060 above, the radio network node 110 may have sent the information indicating fulfillment of one of the at least one criterion after e.g. action A055 has been performed.

In action B050 above, the first core network node 121 may have sent the information indicating fulfillment of one of the at least one criterion after e.g. action B045 has been performed.

In action D050 below, the wireless communication device 130 may have sent the information indicating fulfillment of one of the at least one criterion after e.g. action D042 has been performed.

Action C035

The obtaining C030 of the information relating to which of the first and second common QoS profiles to apply may comprise detecting fulfillment of one of the at least one criterion. The second core network node 122 may thus generate the information indicating fulfillment of one of the at least one criterion, e.g. as derived from the detection of the fulfillment of the at least one criterion. Accordingly, it may be that the information relating to which of the first and second common QoS profiles to apply is embodied in the form of the information indicating fulfillment of one of the at least one criterion.

In some examples, when the second core network node 122 includes an MME and a PGW, the MME may detect that the wireless communication device 130 has a membership in a CSG. Subsequently, the MME may send a report, e.g. to the PGW. The report informs the PGW about that the wireless communication device 130 has the membership in the CSG.

Action C038

Thanks to that the second core network node 122 has obtained the information relating to which of the first and second common QoS profiles to apply according to one or more of actions C030, C032 and C035, the second core network node 122 may select the first or second common QoS profile based on the information indicating fulfillment of one of the at least one criterion.

Action C040

Typically when action C035 has been performed, the second core network node 122 may send, to the radio network node 110 or the first core network node 122 or the wireless communication device 130, the information about the fulfillment of one of the at least one criterion.

As mentioned above, the at least one criterion may specify one or more of:
an identity for radio network nodes,
an identity for radio network cells,
an identity for closed subscriber groups,
a membership of a closed subscriber group,
an identity for identifying packets of the traffic, the identity being associated with the first or second common QoS profile, and
an identity for applications generating the traffic, and/or
an identity for services generating the traffic.

As mentioned above, the common bearer may be an AS bearer for carrying the traffic via a radio network node 110 at Access Stratum level. The Access Stratum level refers to that the radio network node 110 may be able to interpret and process the traffic passing therethrough. The common bearer request may be an AS bearer request sent to the radio network node 110. The first common QoS profile may comprise a first AS QoS profile relating to the AS bearer and the second QoS profile may comprise a second AS QoS profile relating to the AS bearer.

Again, the common bearer may be a NAS bearer for carrying the traffic via a radio network node 110 at Non-Access Stratum level. The Non-Access Stratum level refers to that the radio network node 110 may be unable to interpret and process the traffic passing therethrough. The bearer request may be an NAS bearer request sent to the wireless communication device 130. The first common QoS profile may comprise a first NAS QoS profile relating to the NAS bearer and the second common QoS profile may comprise a second NAS QoS profile relating to the AS bearer.

Figure 9:
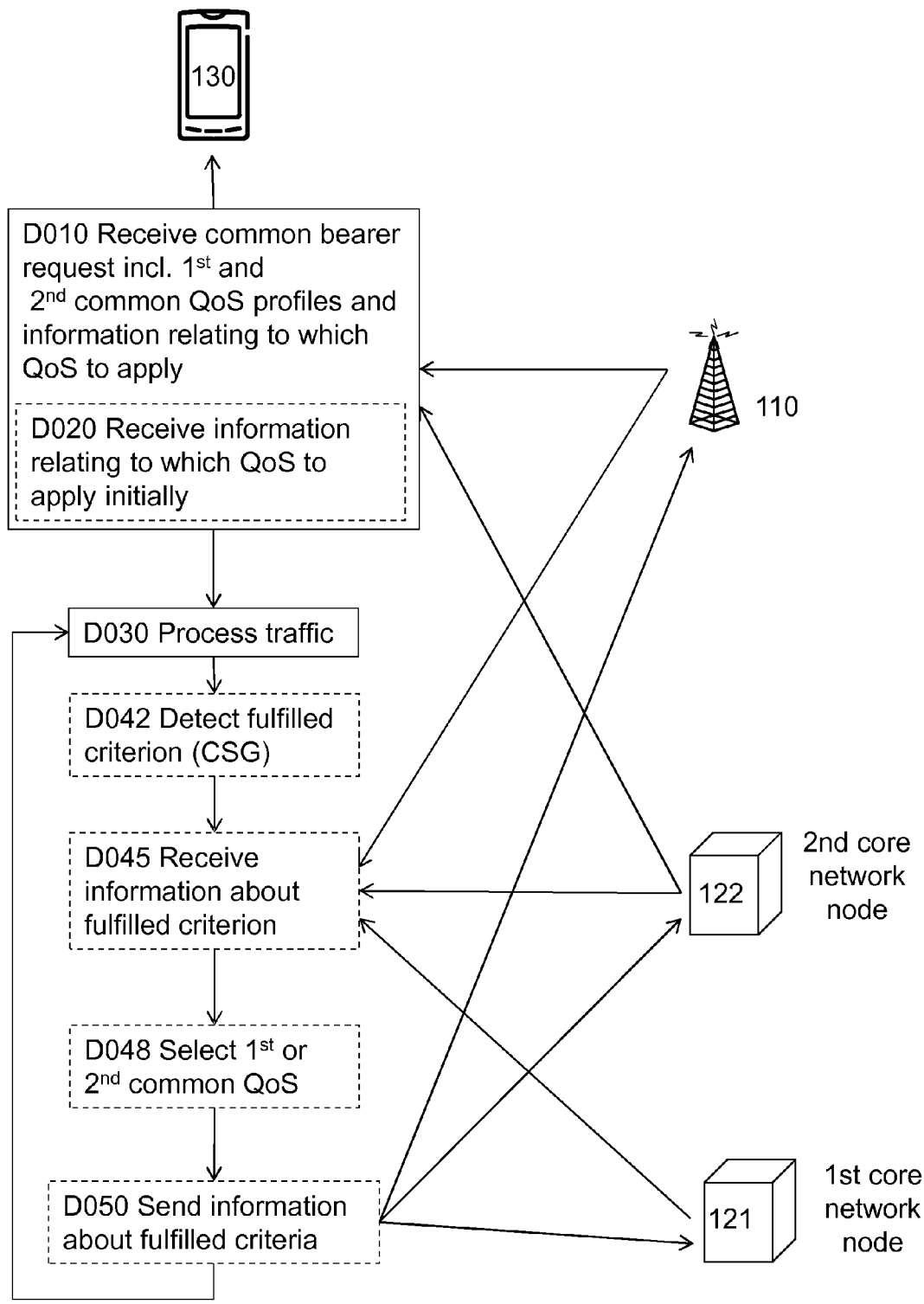
FIG. 9 is a flowchart illustrating embodiments of the method in the wireless communication device.

In FIG. 9, a schematic flowchart of exemplifying methods in the wireless communication device 130 is shown. Accordingly, the wireless communication device 130 performs a method for handling traffic on a common bearer. The common bearer is capable of carrying the traffic between the wireless communication device 130 and a first core network node 121.

One or more of the following actions may be performed in any suitable order.

Action D010

The wireless communication device 130 receives, from the radio network node 110 or the second core network node 122, a common bearer request for setting up the common bearer and information relating to which of a first common QoS profile and a second common QoS profile to apply when processing the traffic. The common bearer request includes the first common QoS profile and the second common QoS profile.

In this manner, the wireless communication device 130 is made aware of the first and second common QoS profiles and the information relating to which of the first and second common QoS profiles to apply.

Action D020

The wireless communication device 130 may receive information relating to which QoS to apply initially. In this example, the wireless communication device 130 receives this information explicitly. In other examples, the wireless communication device 130 may apply the QoS that is received first initially, even when two QoS profiles are received in one and the same message.

Action D030

The wireless communication device 130 processes the traffic while applying the first or second common QoS profile as derived from the information relating to which of the first and second common QoS profiles to apply when processing the traffic. As elaborated below in e.g. action D042 and D045, the information relating to which of the first and second common QoS profiles to apply may directly indicate one of the first and second common QoS profiles to be applied. Alternatively, the information relating to which of the first and second common QoS profiles to apply may specify the at least one criterion. Thanks to the at least one criterion, the wireless communication device may by itself determine which of the first and second common QoS profiles to apply.

Action D042

Thus, in some first examples, the information relating to which of the first and second QoS profiles to apply when processing the traffic may comprise at least one criterion for applying the first common QoS profile or the second common QoS profile when processing the traffic.

Thanks to the knowledge about the at least one criterion, the wireless communication device 130 may detect fulfillment of one of the at least one criterion. Next, the processing D030 of the traffic may comprise processing the traffic while applying the first or second common QoS profile according to the fulfilled one of the at least one criterion. Hence, the wireless communication device 130 determines which of the first and second common QoS profile to apply based on the at least one criterion. The wireless communication device 130 may then also generate information indicating fulfillment of one of the at least one criterion.

As mentioned, the at least one criterion may specify one or more of:
an identity for radio network nodes,
an identity for radio network cells,
an identity for closed subscriber groups,
a membership of a closed subscriber group,
an identity for identifying packets of the traffic, the identity being associated with the first or second common QoS profile,
an identity for applications generating the traffic, and
an identity for services generating the traffic.

Moreover, in some second examples, the information relating to which of the first and second QoS profiles may comprise information indicating fulfillment of one of the at least one criterion. In this manner, the wireless device 130 receives explicit information concerning which of the first and second common QoS profiles to apply.

For example, the information may indicate change of common QoS profile, e.g. a true/false or one/zero value. In this example, the wireless communication device 130 handles two different common QoS profiles. Upon reception of the information indicating change of common QoS profile, the wireless communication device accordingly switches from one common QoS profile to another common QoS profile.

As another example, the information may indicate a value representing a criterion that is fulfilled. The wireless communication device 130 may then derive therefrom which of the first and second common QoS profiles to apply, since the wireless communication device 130 have received requisite information in action D010.

Action D045

The wireless communication device 130 may receive, from the radio network node 110, the first core network node 121, or the second core network node 122, information indicating fulfillment of one of the at least one criterion.

Action D048

The wireless communication device 130 may select the first or second common QoS profile based on the information indicating fulfillment of one of the at least one criterion.

Action D050

Typically when action D042 has been performed, the wireless communication device 130 may send, to the radio network node 110 or the first core network node 121 or the second core network node 122, information indicating fulfillment of one of the at least one criterion.

After action D048 may have been performed, action D030 may be performed while using the selected common QoS profile. In this context, it may be noted that action D030 is performed repeatedly, before and/or after one or more of actions D042 through D050.

As mentioned, the common bearer may be an AS bearer for carrying the traffic via a radio network node 110 at Access Stratum level. The Access Stratum level refers to that the radio network node 110 may be able to interpret and process the traffic passing therethrough. The common bearer request may be an AS bearer request sent to the radio network node 110. The first common QoS profile may comprise a first AS QoS profile relating to the AS bearer and the second QoS profile may comprise a second AS QoS profile relating to the AS bearer.

Again, the common bearer may be a NAS bearer for carrying the traffic via a radio network node 110 at Non-Access Stratum level. The Non-Access Stratum level refers to that the radio network node 110 may be unable to interpret and process the traffic passing therethrough. The bearer request may be an NAS bearer request sent to the wireless communication device 130. The first common QoS profile may comprise a first NAS QoS profile relating to the NAS bearer and the second common QoS profile may comprise a second NAS QoS profile relating to the AS bearer.

Figure 10:
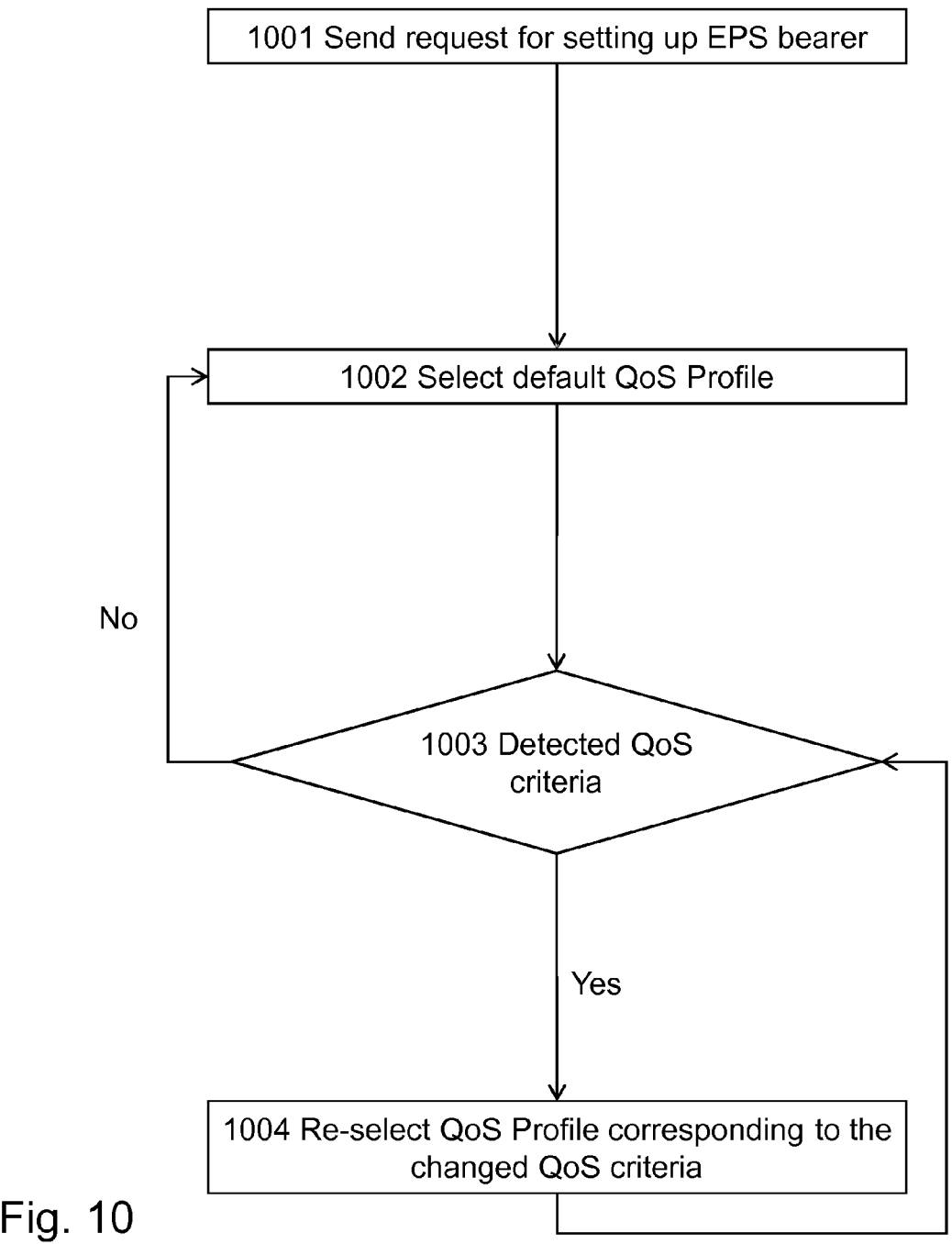
FIG. 10 is a flowchart illustrating an example embodiment.

With reference to FIG. 10, an exemplifying embodiment when implemented in an EPS/LTE system is illustrated. In this example, it is assumed that there are N parallel QoS profiles. A plurality of QoS enforcement nodes, such as a UE, a RAN node, a Serving Gateway, are identified.

Action 1001

The PDN GW sends one or more requests for setting up an EPS bearer between a UE and the PDN GW. In this manner, a bearer with N QoS Profiles is set up in the PDN GW towards the RAN. Each QoS Profile may correspond to a criteria known in the QoS enforcement points/nodes.

Action 1002

One of the N QoS profiles may be a default QoS profile, i.e. a QoS profile to apply initially to traffic passing through the plurality of QoS enforcement nodes. See also action A020 above. This means that the default QoS profile is set as active, i.e. applied to traffic, in the affected QoS enforcement points/nodes Action 1003

At least one QoS enforcement node detects that a criteria for selection of QoS profile is fulfilled, or that a previously fulfilled criteria is no longer fulfilled.

Action 1004

The at least one QoS enforcement node thus re-selects one of the N QoS profiles based on the fulfilled criteria, e.g. the criteria changes from non-fulfilled to fulfilled.

In FIG. 10, a process of updating QoS is illustrated. Each time a QoS criterion, referred to as the at least one criterion above, for changing QoS is met, the QoS enforcement nodes, such as the radio network node 110, the first core network node 121 and/or the wireless communication device 130, change QoS configuration according to the QoS profile given by the QoS criterion, i.e. the first or second common QoS profile. Note that not all QoS enforcement node are required to implement one of the embodiments herein. Instead, the methods herein may be applied locally in one or a few QoS enforcement nodes. Then, the end-to-end QoS will not be affected, only selected parts of an end-to-end connection, or end-to-end bearer.

It shall be understood that the bearer configuration, as updated according to the embodiments herein, may be signaled in handover. For example, when a RAN-level handover is performed, such as X2-based handover, a new bearer configuration may be signaled to a target node, e.g. a base station to which a wireless communication device is handed over.

Figure 11:
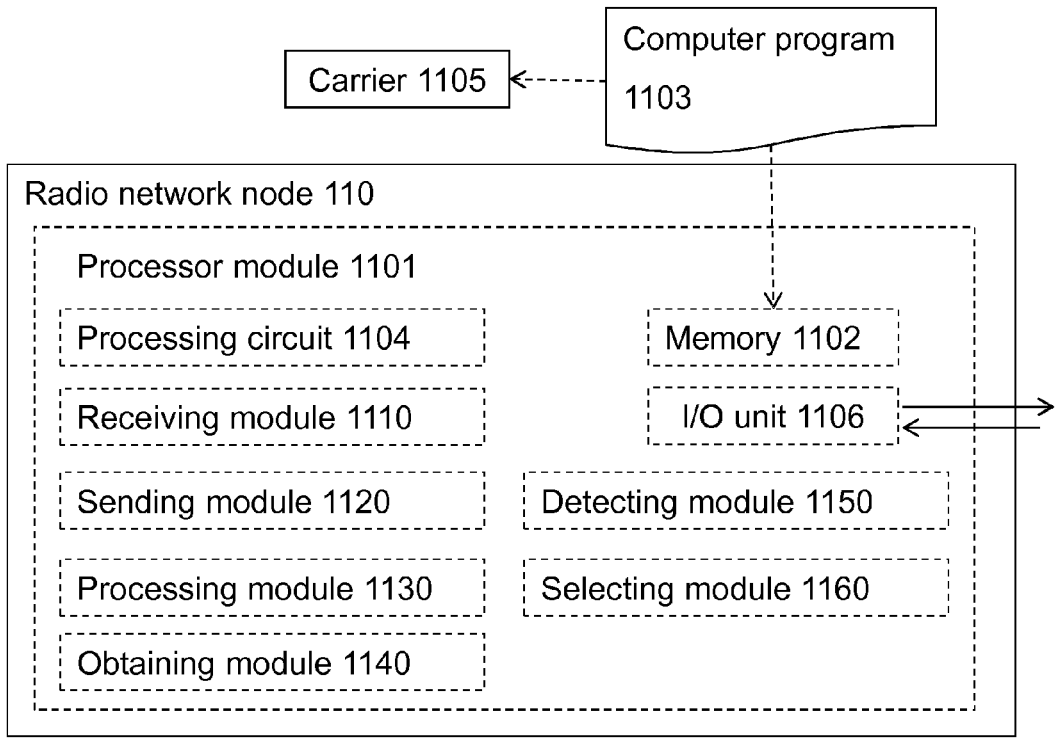
FIG. 11 is a block diagram illustrating embodiments of the radio network node.

With reference to FIG. 11, a schematic block diagram of embodiments of the radio network node 110 of FIG. 4 is shown.

The radio network node 110 may comprise a processor module 1101, such as a means, one or more hardware modules and/or one or more software modules for performing the methods described herein.

The radio network node 110 may further comprise a memory 1102. The memory may comprise, such as contain or store, a computer program 1103.

According to some embodiments herein, the processor module 1101 comprises, e.g. 'is embodied in the form of' or 'realized by', a processing circuit 1104 as an exemplifying hardware module. In these embodiments, the memory 1102 may comprise the computer program 1103, comprising computer readable code units executable by the processing circuit 1104, whereby the radio network node 110 is operative to perform the methods of FIGS. 5, 6 and/or 10.

In some other embodiments, the computer readable code units may cause the radio network node 110 to perform the method according to FIGS. 5, 6 and/or 10 when the computer readable code units are executed by the radio network node 110.

FIG. 11 further illustrates a carrier 1105, or program carrier, which comprises the computer program 1103 as described directly above.

In some embodiments, the processor module 1101 comprises an Input/Output unit 1106, which may be exemplified by a receiving module and/or a sending module as described below when applicable.

In further embodiments, the processor module 1101 may comprise one or more of a receiving module 1110, a sending module 1120, a processing module 1130, an obtaining module 1140, a detecting module 1150, and a selecting module 1160, as exemplifying hardware modules. In other examples, one or more of the aforementioned exemplifying hardware modules may be implemented as one or more software modules.

In view of the above, there is provided a radio network node 110 for handling traffic on an Access Stratum "AS" bearer. As mentioned, the Access Stratum bearer is capable of carrying the traffic between a first core network node 121 and a wireless communication device 130.

Thus, according to the various embodiments described above, the radio network node 110, the processor module 1101 and/or the receiving module 1110 is configured for receiving, from a second core network node 122, an Access Stratum bearer request for setting up the Access Stratum bearer to carry traffic between the first core network node 121 and the wireless communication device 130, wherein the Access Stratum bearer request includes a first AS QoS profile, a second AS QoS profile, and at least one criterion for applying the first or second AS QoS profile when processing the traffic.

The radio network node 110, the processor module 1101 and/or the processing module 1130 is configured for processing the traffic while applying the first or second AS QoS profile based on whether or not one of the at least one criterion is fulfilled.

As mentioned, the at least one criterion may specify one or more of:
  an identity for radio network nodes,
  an identity for radio network cells,
  an identity for closed subscriber groups,
  a membership of a closed subscriber group,
  an identity for identifying packets of the traffic, the identity being associated with the first or second AS QoS profile,
  an identity for applications generating the traffic, and
  an identity for services generating the traffic.

The at least one criterion may specify an identity for closed subscriber groups, wherein the radio network node 110 may be configured for processing the traffic when the wireless communication device 130 belongs to a closed subscriber group having an identity equal to the identity specified by the at least one criterion.

The radio network node 110, the processor module 1101 and/or the obtaining module 1140 may be configured for obtaining information indicating fulfillment of one of the at least one criterion.

The radio network node 110, the processor module 1101 and/or the obtaining module 1140 or the receiving module 1110 may be configured for obtaining the information indicating fulfillment of one of the at least one criterion by receiving, from the first core network node 121 or from the second core network node 122 or from the wireless communication device 130, the information indicating fulfillment of one of the at least one criterion.

The radio network node 110, the processor module 1101, the obtaining module 1140 and/or the detecting module 1150 may be configured for obtaining the information indicating fulfillment of one of the at least one criterion by detecting fulfillment of one of the at least one criterion.

The radio network node 110, the processor module 1101 and/or the selecting module 1160 may be configured for selecting the first or second AS QoS profile based on the information indicating fulfillment of one of the at least one criterion.

The radio network node 110, the processor module 1101 and/or the sending module 1120 may be configured for sending, to the first core network node 121 or to the second core network node 122 or to the wireless communication device 130, the information indicating fulfillment of one of the at least one criterion.

Figure 12:
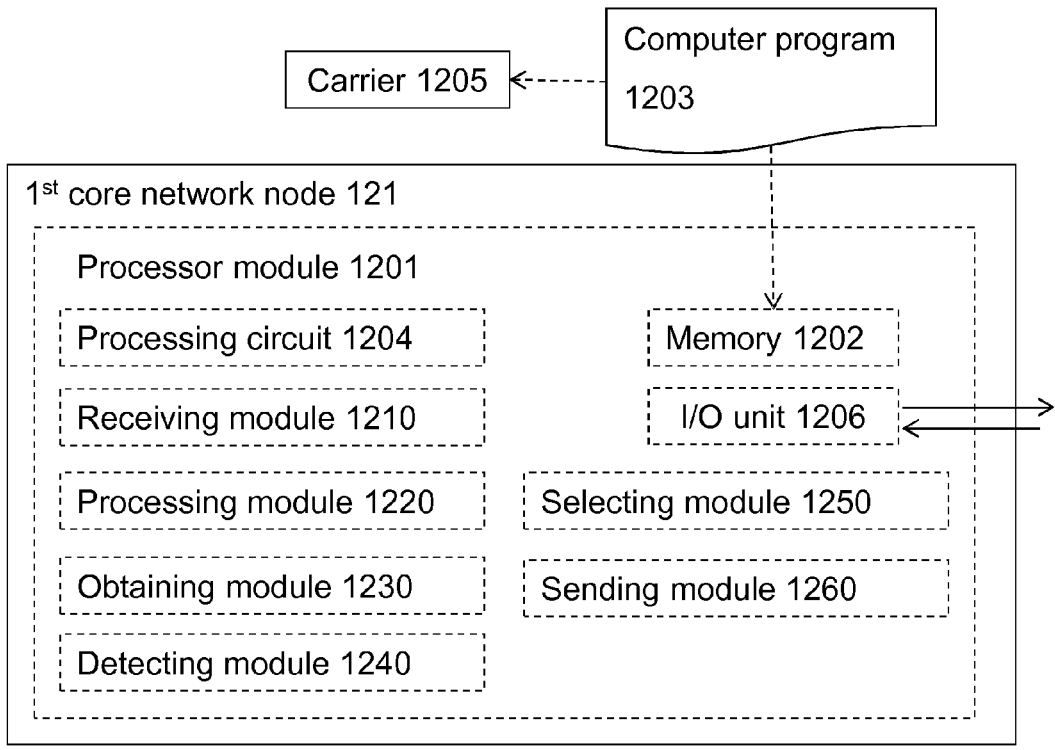
FIG. 12 is a block diagram illustrating embodiments of the first core network node.

With reference to FIG. 12, a schematic block diagram of embodiments of the first core network node 121 of FIG. 4 is shown.

The first core network node 121 may comprise a processor module 1201, such as a means, one or more hardware modules and/or one or more software modules for performing the methods described herein.

The first core network node 121 may further comprise a memory 1202. The memory may comprise, such as contain or store, a computer program 1203.

According to some embodiments herein, the processor module 1201 comprises, e.g. 'is embodied in the form of' or 'realized by', a processing circuit 1204 as an exemplifying hardware module. In these embodiments, the memory 1202 may comprise the computer program 1203, comprising computer readable code units executable by the processing circuit 1204, whereby the first core network node 121 is operative to perform the methods of FIGS. 5, 7 and/or 10.

In some other embodiments, the computer readable code units may cause the first core network node 121 to perform the method according to FIGS. 5, 7 and/or 10 when the computer readable code units are executed by the first core network node 121.

FIG. 12 further illustrates a carrier 1205, or program carrier, which comprises the computer program 1203 as described directly above.

In some embodiments, the processor module 1201 comprises an Input/Output unit 1206, which may be exemplified by a receiving module and/or a sending module as described below when applicable.

In further embodiments, the processor module 1201 may comprise one or more of a receiving module 1210, a processing module 1220, an obtaining module 1230, a detecting module 1240, a selecting module 1250, and a sending module 1260, as exemplifying hardware modules. In other examples, one or more of the aforementioned exemplifying hardware modules may be implemented as one or more software modules.

In view of the above, there is provided a first core network node 121 for handling traffic on a common bearer.

As mentioned, the common bearer is capable of carrying the traffic between the first core network node 121 and a wireless communication device 130. The first core network node 121 manages at least one criterion for applying a first or a second common QoS profile when processing the traffic.

Thus, according to the various embodiments described above, the first core network node 121, the processor module 1201 and/or the receiving module 1210 is configured for receiving, from a second core network node 122, a common bearer request for setting up the common bearer to carry traffic between the first core network node 121 and the wireless communication device 130, wherein the common bearer request includes a first common QoS profile, a second common QoS profile, and at least one criterion for applying the first or second common QoS profile when processing the traffic.

The first core network node 121, the processor module 1201 and/or the processing module 1220 is configured for processing the traffic while applying the first or second common QoS profile.

As mentioned, the at least one criterion may specify one or more of:
  an identity for radio network nodes,
  an identity for radio network cells, an identity for closed subscriber groups,
a membership of a closed subscriber group,
an identity for identifying packets of the traffic, the identity being associated with the first or second common QoS profile,
an identity for applications generating the traffic, and
an identity for services generating the traffic.

The first core network node 121, the processor module 1201 and/or the obtaining module 1230 may be configured for obtaining information relating to which of the first and second common QoS profiles to apply when processing the traffic.

The first core network node 121, the processor module 1201, the obtaining module 1230 and/or the receiving module 1210 may be configured for obtaining the information relating to which of the first and second common QoS profiles to apply by receiving, from a second core network node 122 or a radio network node 110 or the wireless communication device 130, the information indicating fulfillment of one of the at least one criterion.

The first core network node 121, the processor module 1201, the obtaining module 1230 and/or the detecting module 1240 may be configured for obtaining the information relating to which of the first and second common QoS profiles to apply by detecting fulfillment of one of the at least one criterion, thereby generating the information indicating fulfillment of one of the at least one criterion.

The first core network node 121, the processor module 1201 and/or the selecting module 1250 may be configured for selecting the first or second common QoS profile based on the information indicating fulfillment of one of the at least one criterion.

The first core network node 121, the processor module 1201 and/or the sending module 1260 may be configured for sending, to the wireless communication device 130 or the radio network node 110 or the second core network node 122, the information about the fulfillment of one of the at least one criterion.

As mentioned, the common bearer may be an Access Stratum "AS" bearer for carrying the traffic via a radio network node 110 at Access Stratum level, wherein the Access Stratum level refers to that the radio network node 110 may be able to interpret and process the traffic passing therethrough, wherein the common bearer request may be an AS bearer request sent to the radio network node 110, wherein the first common QoS profile may comprise a first AS QoS profile relating to the AS bearer and the second QoS profile may comprise a second AS QoS profile relating to the AS bearer.

Again, the common bearer may be a Non-Access Stratum "NAS" bearer for carrying the traffic via a radio network node 110 at Non-Access Stratum level, wherein the Non-Access Stratum level refers to that the radio network node 110 may be unable to interpret and process the traffic passing therethrough, wherein the bearer request may be an NAS bearer request sent to the wireless communication device 130, wherein the first common QoS profile may comprise a first NAS QoS profile relating to the NAS bearer and the second common QoS profile may comprise a second NAS QoS profile relating to the AS bearer.

Figure 13:
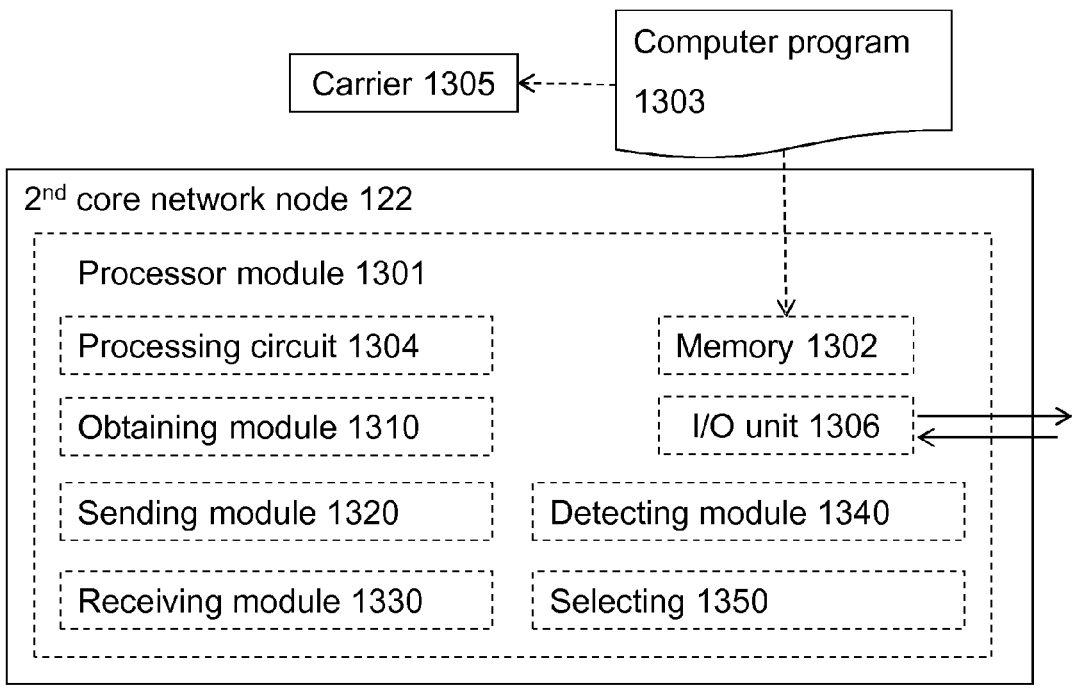
FIG. 13 is a block diagram illustrating embodiments of the second core network node.

With reference to FIG. 13, a schematic block diagram of embodiments of the second core network node 122 of FIG. 4 is shown.

The second core network node 122 may comprise a processor module 1301, such as a means, one or more hardware modules and/or one or more software modules for performing the methods described herein.

The second core network node 122 may further comprise a memory 1302. The memory may comprise, such as contain or store, a computer program 1303.

According to some embodiments herein, the processor module 1301 comprises, e.g. 'is embodied in the form of' or 'realized by', a processing circuit 1304 as an exemplifying hardware module. In these embodiments, the memory 1302 may comprise the computer program 1303, comprising computer readable code units executable by the processing circuit 1304, whereby the second core network node 122 is operative to perform the methods of FIGS. 5, 8 and/or 10.

In some other embodiments, the computer readable code units may cause the second core network node 122 to perform the method according to FIGS. 5, 8 and/or 10 when the computer readable code units are executed by the second core network node 122.

FIG. 13 further illustrates a carrier 1305, or program carrier, which comprises the computer program 1303 as described directly above.

In some embodiments, the processor module 1301 comprises an Input/Output unit 1306, which may be exemplified by a receiving module and/or a sending module as described below when applicable.

In further embodiments, the processor module 1301 may comprise one or more of an obtaining module 1310, a sending module 1320, a receiving module 1330, a detecting module 1340, and a selecting module 1350, as exemplifying hardware modules. In other examples, one or more of the aforementioned exemplifying hardware modules may be implemented as one or more software modules.

In view of the above, there is provided a second core network node 122 for managing a common bearer.

As mentioned, the common bearer is capable of carrying traffic between the first core network node 121 and a wireless communication device 130.

Thus, according to the various embodiments described above, the second core network node 122, the processor module 1301 and/or the obtaining module 1310 is configured for obtaining information about a first common QoS profile and a second common QoS profile and at least one criterion for applying a first or a second common QoS profile when processing the traffic.

The second core network node 122, the processor module 1301 and/or the sending module 1320 is configured for sending, to the radio network node 110 or the first core network node 121 or the wireless communication device 130, a common bearer request for setting up the common bearer, wherein the common bearer request includes the first and second common QoS profiles, and the at least one criterion.

The second core network node 122, the processor module 1301 and/or the obtaining module 1310 may be configured for obtaining information relating to which of the first and second common QoS profiles to be applied when the traffic is processed by the first core network node 121, the wireless communication device 130 or the radio network node 110.

The second core network node 122, the processor module 1301, the obtaining module 1310 and/or the receiving module 1330 may be configured for obtaining the information relating to which of the first and second common QoS profiles to apply by receiving, from the first core network node 121 or the radio network node 110 or the wireless communication device 130, the information indicating fulfillment of one of the at least one criterion.

The second core network node 122, the processor module 1301, the obtaining module 1310 and/or the detecting module 1340 may be configured for obtaining the information relating to which of the first and second common QoS profiles to apply by detecting fulfillment of one of the at least one criterion, thereby generating the information indicating fulfillment of one of the at least one criterion.

The second core network node 122, the processor module 1301 and/or the selecting module 1350 may be configured for selecting the first or second common QoS profile based on the information indicating fulfillment of one of the at least one criterion.

The second core network node 122, the processor module 1301 and/or the sending module 1320 may be configured for sending, to the wireless communication device 130 or the radio network node 110 or the first core network node 122, the information about the fulfillment of one of the at least one criterion.

As mentioned, the at least one criterion may specify one or more of:
- an identity for radio network nodes,
- an identity for radio network cells,
- an identity for closed subscriber groups,
- a membership of a closed subscriber group,
- an identity for identifying packets of the traffic, the identity being associated with the first or second common QoS profile,
- an identity for applications generating the traffic, and
- an identity for services generating the traffic.

Again, the common bearer may be an Access Stratum "AS" bearer for carrying the traffic via a radio network node 110 at Access Stratum level, wherein the Access Stratum level refers to that the radio network node 110 may be able to interpret and process the traffic passing therethrough, wherein the common bearer request may be an AS bearer request sent to the radio network node 110, wherein the first common QoS profile may comprise a first AS QoS profile relating to the AS bearer and the second QoS profile may comprise a second AS QoS profile relating to the AS bearer.

Also as mentioned before, the common bearer may be a Non-Access Stratum "NAS" bearer for carrying the traffic via a radio network node 110 at Non-Access Stratum level, wherein the Non-Access Stratum level refers to that the radio network node 110 may be unable to interpret and process the traffic passing therethrough, wherein the bearer request may be an NAS bearer request sent to the wireless communication device 130, wherein the first common QoS profile may comprise a first NAS QoS profile relating to the NAS bearer and the second common QoS profile may comprise a second NAS QoS profile relating to the AS bearer.

Figure 14:
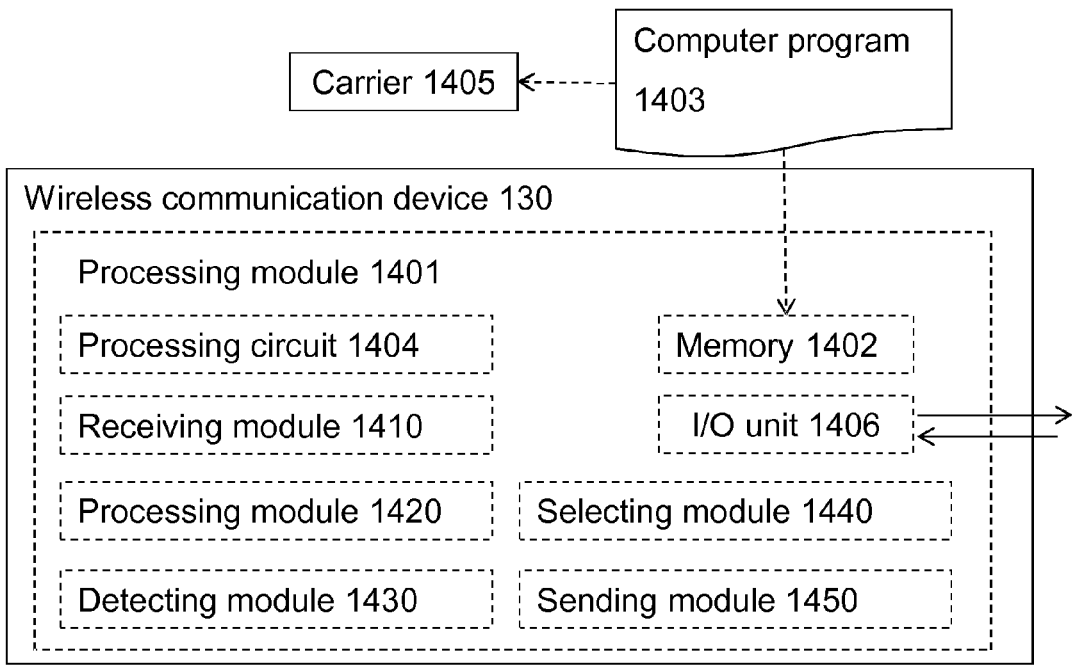
FIG. 14 is a block diagram illustrating embodiments of the wireless communication device.

With reference to FIG. 14, a schematic block diagram of embodiments of the wireless communication device 130 of FIG. 4 is shown.

The wireless communication device 130 may comprise a processor module 1401, such as a means, one or more hardware modules and/or one or more software modules for performing the methods described herein.

The wireless communication device 130 may further comprise a memory 1402. The memory may comprise, such as contain or store, a computer program 1403.

According to some embodiments herein, the processor module 1401 comprises, e.g. 'is embodied in the form of' or 'realized by', a processing circuit 1404 as an exemplifying hardware module. In these embodiments, the memory 1402 may comprise the computer program 1403, comprising computer readable code units executable by the processing circuit 1404, whereby the wireless communication device 130 is operative to perform the methods of FIGS. 5, 9 and/or 10.

In some other embodiments, the computer readable code units may cause the wireless communication device 130 to perform the method according to FIGS. 5, 9 and/or 10 when the computer readable code units are executed by the wireless communication device 130.

FIG. 14 further illustrates a carrier 1405, or program carrier, which comprises the computer program 1403 as described directly above.

In some embodiments, the processor module 1401 comprises an Input/Output unit 1406, which may be exemplified by a receiving module and/or a sending module as described below when applicable.

In further embodiments, the processor module 1401 may comprise one or more of a receiving module 1410, a processing module 1420, a detecting module 1430, a selecting module 1440, and a sending module 1450, as exemplifying hardware modules. In other examples, one or more of the aforementioned exemplifying hardware modules may be implemented as one or more software modules.

In view of the above, there is provided a wireless communication device 130 for handling traffic on a common bearer. The common bearer is capable of carrying the traffic between the wireless communication device 130 and a first core network node 121.

Thus, according to the various embodiments described above, the wireless communication device 130, the processor module 1401 and/or the receiving module 1410 is configured for receiving, from the radio network node 110 or the second core network node 122, a common bearer request for setting up the common bearer and information relating to which of a first common QoS profile and a second common QoS profile to apply when processing the traffic, wherein the common bearer request includes the first common QoS profile and the second common QoS profile.

Moreover, the wireless communication device 130, the processor module 1401 and/or the processing module 1420 is configured for the traffic while applying the first or second common QoS profile as derived from the information relating to which of the first and second common QoS profiles to apply when processing the traffic.

In some embodiments, the information relating to which of the first and second QoS profiles to apply when processing the traffic may comprise at least one criterion for applying the first common QoS profile or the second common QoS profile when processing the traffic. Then, the wireless communication device 130, the processor module 1401 and/or the detecting module 1430 is configured for detecting fulfillment of one of the at least one criterion. The wireless communication device 130, the processor module 1401 and/or the processing module 1420 may thus be configured for processing the traffic by processing the traffic while applying the first or second common QoS profile according to the fulfilled one of the at least one criterion.

As mentioned, the at least one criterion may specify one or more of:
- an identity for radio network nodes,
- an identity for radio network cells,
- an identity for closed subscriber groups,
- a membership of a closed subscriber group,
- an identity for identifying packets of the traffic, the identity being associated with the first or second common QoS profile, and
- an identity for applications generating the traffic, and/or
- an identity for services generating the traffic.

The information relating to which of the first and second QoS profiles may comprise information indicating fulfillment of one of the at least one criterion The wireless communication device 130, the processor module 1401 and/or the sending module 1450 may be configured for sending, to the radio network node 110 or the first core network node 121 or the second core network node 122, information indicating fulfillment of one of the at least one criterion.

As mentioned, the common bearer may be an Access Stratum "AS" bearer for carrying the traffic via a radio network node 110 at Access Stratum level, wherein the Access Stratum level refers to that the radio network node 110 may be able to interpret and process the traffic passing therethrough, wherein the common bearer request may be an AS bearer request sent to the radio network node 110, wherein the first common QoS profile may comprise a first AS QoS profile relating to the AS bearer and the second QoS profile may comprise a second AS QoS profile relating to the AS bearer.

Again, the common bearer may be a Non-Access Stratum "NAS" bearer for carrying the traffic via a radio network node 110 at Non-Access Stratum level, wherein the Non-Access Stratum level refers to that the radio network node 110 may be unable to interpret and process the traffic passing therethrough, wherein the bearer request may be an NAS bearer request sent to the wireless communication device 130, wherein the first common QoS profile may comprise a first NAS QoS profile relating to the NAS bearer and the second common QoS profile may comprise a second NAS QoS profile relating to the AS bearer.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner.

As used herein, the term "unit" may refer to one or more functional units, each of which may be implemented as one or more hardware modules and/or one or more software modules in a node.

As used herein, the term "program carrier" may refer to one of an electronic signal, an optical signal, a radio signal, and a computer readable medium. In some examples, the program carrier may exclude transitory, propagating signals, such as the electronic, optical and/or radio signal. Thus, in these examples, the carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a determining means, estimating means, capturing means, associating means, comparing means, identification means, selecting means, receiving means, sending means or the like as disclosed herein. As an example, the expression "means" may be a module corresponding to the modules listed above in conjunction with the Figures.

As used herein, the term "software module" may refer to a software application, a Dynamic Link Library (DLL), a software component, a software object, an object according to Component Object Model (COM), a software component, a software function, a software engine, an executable binary software file or the like.

As used herein, the term "processing circuit" may refer to a processing unit, a processor, an Application Specific Integrated Circuit (ASIC), a Field-Programmable Gate Array (FPGA) or the like. The processing circuit or the like may comprise one or more processor kernels.

As used herein, the expression "configured for/to", may mean that a processing circuit is configured to, or adapted to, by means of software configuration and/or hardware configuration, perform one or more of the actions described herein.

As used herein, the term "action" may refer to an action, a step, an operation, a response, a reaction, an activity or the like.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc.

As used herein, the term "computer readable code units" may be text of a computer program, parts of or an entire binary file representing a computer program in a compiled format or anything there between.

As used herein, the term "radio resource" may refer to a certain coding of a signal and/or a time frame and/or a frequency range in which the signal is transmitted. In some examples, a resource may refer to one or more Physical Resource Blocks (PRB) which is used when transmitting the signal. In more detail, a PRB may be in the form of Orthogonal Frequency Division Multiplexing (OFDM) PHY resource blocks (PRB). The term "physical resource block" is known from 3GPP terminology relating to e.g. Long Term Evolution Systems.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a bit string.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a radio network node, for handling traffic on an Access Stratum (AS) bearer, wherein the Access Stratum bearer is capable of carrying the traffic between a first core network node and a wireless communication device, the method comprising:

receiving, from a second core network node, an Access Stratum bearer request for setting up the Access Stratum bearer to carry traffic between the first core network node and the wireless communication device, wherein the Access Stratum bearer request includes a first AS Quality of Service profile, a second AS Quality of Service profile, and at least one criterion for applying the first or second AS Quality of Service profile when processing the traffic, wherein the Access Stratum bearer is to carry the traffic at Access Stratum level, wherein the Access Stratum level refers to a level that the radio network node is able to interpret and process the traffic passing through;

processing the traffic while applying the first or second AS Quality of Service profile to the traffic based on whether or not one of the at least one criterion is fulfilled;

receiving information indicating fulfillment of one of the at least one criterion; and selecting the first or second AS Quality of Service profile for the traffic based on the information indicating the fulfillment of one of the at least one criterion.

2. The method according to claim 1, wherein the at least one criterion specifies one or more of:
an identity for radio network nodes,
an identity for radio network cells,
an identity for closed subscriber groups,
a membership of a closed subscriber group,
an identity for identifying packets of the traffic, the identity being associated with the first or second AS Quality of Service profile,
an identity for applications generating the traffic, and
an identity for services generating the traffic.

3. The method according to claim 2, when the at least one criterion specifies an identity for closed subscriber groups, wherein the processing of the traffic is performed when the wireless communication device belongs to a closed subscriber group having an identity equal to the identity specified by the at least one criterion.

4. The method according to claim 1, wherein the receiving further comprises:
receiving, from the first core network node or from the second core network node or from the wireless communication device, the information indicating fulfillment of one of the at least one criterion.

5. The method according to claim 1, further comprising:
detecting fulfillment of one of the at least one criterion, thereby generating the information indicating fulfillment of one of the at least one criterion.

6. The method according to claim 1, the method further comprising:
sending, to the first core network node or to the second core network node or to the wireless communication device, the information indicating fulfillment of one of the at least one criterion.

7. A method, performed by a first core network node, for handling traffic on a common bearer, wherein the common bearer is capable of carrying the traffic between the first core network node and a wireless communication device, wherein the first core network node manages at least one criterion for applying a first or a second common Quality of Service profile when processing the traffic, the method comprising:
receiving, from a second core network node, a common bearer request for setting up the common bearer to carry traffic between the first core network node and the wireless communication device, wherein the common bearer request includes a first common Quality of Service profile, a second common Quality of Service profile, and at least one criterion for applying the first or second common Quality of Service profile when processing the traffic, wherein the common bearer is one of an Access Stratum (AS) bearer or an Non-Access Stratum (NAS) bearer for carrying the traffic via a radio network node at AS level or NAS level respectively, and wherein the AS level refers to a level that the radio network node is able to interpret and process the traffic passing through while the NAS level refers to a level that the radio network node is not able to do so;

processing the traffic while applying the first or second common Quality of Service profile;

receiving information indicating fulfillment of one of the at least one criterion; and selecting the first or second AS Quality of Service profile for the traffic based on the information indicating the fulfillment of one of the at least one criterion.

8. The method according to claim 7, wherein the at least one criterion specifies one or more of:
an identity for radio network nodes,
an identity for radio network cells,
an identity for closed subscriber groups,
a membership of a closed subscriber group,
an identity for identifying packets of the traffic, the identity being associated with the first or second common Quality of Service profile,
an identity for applications generating the traffic, and
an identity for services generating the traffic.

9. The method according to claim 7, wherein receiving the information comprises:
receiving, from a second core network node or a radio network node or the wireless communication device, the information indicating fulfillment of one of the at least one criterion.

10. The method according to claim 7, further comprising:
detecting fulfillment of one of the at least one criterion, thereby generating the information indicating fulfillment of one of the at least one criterion.

11. The method according to claim 7, the method further comprising:
sending, to the wireless communication device or the radio network node or the second core network node, the information about fulfillment of one of the at least one criterion.

12. The method according to claim 7, wherein the common bearer request is an AS bearer request sent to the radio network node, wherein the first common Quality of Service profile comprises a first AS Quality of Service profile relating to the AS bearer and the second Quality of Service profile comprises a second AS Quality of Service profile relating to the AS bearer.

13. The method according to claim 7, wherein the bearer request is an NAS bearer request sent to the wireless communication device, wherein the first common Quality of Service profile comprises a first NAS Quality of Service profile relating to the NAS bearer and the second common Quality of Service profile comprises a second NAS Quality of Service profile relating to the AS bearer.

14. A method, performed by a second core network node, for managing a common bearer, wherein the common bearer is capable of carrying traffic between a first core network node and a wireless communication device, the method comprising:
obtaining information about a first common Quality of Service profile and a second common Quality of Service profile and at least one criterion for applying a first or a second common Quality of Service profile when processing the traffic; and sending, to a radio network node or the first core network node or the wireless communication device, a common bearer request for setting up the common bearer, wherein the common bearer request includes the first and second common Quality of Service profiles, and the at least one criterion, wherein the common bearer is one of an Access Stratum (AS) bearer or an Non-Access Stratum (NAS) bearer for carrying the traffic via a radio network node at AS level or NAS level respectively, and wherein the AS level refers to a level that the radio network node is able to interpret and process the traffic passing through while the NAS level refers to a level that the radio network node is not able to do so;

receiving information indicating fulfillment of one of the at least one criterion; and selecting the first or second AS Quality of Service profile for the traffic based on the information indicating the fulfillment of one of the at least one criterion.

15. The method according to claim 14, wherein receiving the information comprises:

receiving, from the first core network node or the radio network node or the wireless communication device, information indicating fulfillment of one of the at least one criterion.

16. The method according to claim 14, further comprising:

detecting fulfillment of one of the at least one criterion, thereby generating the information indicating fulfillment of one of the at least one criterion.

17. The method according to claim 15, wherein the method comprises:

sending, to the radio network node or the first core network node or the wireless communication device, the information about the fulfillment of one of the at least one criterion.

18. The method according to claim 14, wherein the at least one criterion specifies one or more of:

an identity for radio network nodes,
an identity for radio network cells,
an identity for closed subscriber groups,
a membership of a closed subscriber group,
an identity for identifying packets of the traffic, the identity being associated with the first or second common Quality of Service profile, and
an identity for applications generating the traffic, and/or
an identity for services generating the traffic.

19. The method according to claim 14, wherein the common bearer request is an AS bearer request sent to the radio network node, wherein the first common Quality of Service profile comprises a first AS Quality of Service profile relating to the AS bearer and the second Quality of Service profile comprises a second AS Quality of Service profile relating to the AS bearer.

20. The method according to claim 14, wherein the bearer request is an NAS bearer request sent to the wireless communication device, wherein the first common Quality of Service profile comprises a first NAS Quality of Service profile relating to the NAS bearer and the second common Quality of Service profile comprises a second NAS Quality of Service profile relating to the AS bearer.

21. A method, performed by a wireless communication device, for handling traffic on a common bearer, wherein the common bearer is capable of carrying the traffic between the wireless communication device and a first core network node, the method comprising:

receiving, from a radio network node or a second core network node, a common bearer request for setting up the common bearer and information relating to which of a first common Quality of Service profile and a second common Quality of Service profile to apply when processing the traffic, wherein the common bearer request includes the first common Quality of Service profile and the second common Quality of Service profile, wherein the common bearer is one of an Access Stratum (AS) bearer or an Non-Access Stratum (NAS) bearer for carrying the traffic via a radio network node at AS level or NAS level respectively, and wherein the AS level refers to a level that the radio network node is able to interpret and process the traffic passing through while the NAS level refers to a level that the radio network node is not able to do so;

processing the traffic while applying the first or second common Quality of Service profile as derived from the information relating to which of the first and second common Quality of Service profiles to apply when processing the traffic;

receiving information indicating fulfillment of one of the at least one criterion; and selecting the first or second AS Quality of Service profile for the traffic based on the information indicating the fulfillment of one of the at least one criterion.

22. The method according to claim 21, wherein the information relating to which of the first and second Quality of Service profiles to apply when processing the traffic comprises at least one criterion for applying the first common Quality of Service profile or the second common Quality of Service profile when processing the traffic, wherein the method further comprises:

detecting fulfillment of one of the at least one criterion; and wherein the processing of the traffic comprises processing the traffic while applying the first or second common Quality of Service profile according to the fulfilled one of the at least one criterion.

23. The method according to claim 22, wherein the at least one criterion specifies one or more of:

an identity for radio network nodes,
an identity for radio network cells,
an identity for closed subscriber groups,
a membership of a closed subscriber group,
an identity for identifying packets of the traffic, the identity being associated with the first or second common Quality of Service profile, and
an identity for applications generating the traffic, and/or
an identity for services generating the traffic.

24. The method according to claim 21, wherein the information relating to which of the first and second Quality of Service profiles comprises information indicating fulfillment of one of the at least one criterion.

25. The method according to claim 21, wherein the method further comprises:

sending, to the radio network node or the first core network node or the second core network node, information indicating fulfillment of one of the at least one criterion.

26. The method according to claim 21, wherein the common bearer request is an AS bearer request sent from the radio network node, wherein the first common Quality of Service profile comprises a first AS Quality of Service profile relating to the AS bearer and the second Quality of Service profile comprises a second AS Quality of Service profile relating to the AS bearer.

27. The method according to claim 21, wherein the common bearer request is a NAS bearer request sent from the second core network node, wherein the first common Quality of Service profile comprises a first NAS Quality of Service profile relating to the NAS bearer and the second common Quality of Service profile comprises a second NAS Quality of Service profile relating to the AS bearer.

28. A radio network node for handling traffic on an Access Stratum (AS) bearer, wherein the Access Stratum bearer is capable of carrying the traffic between a first core network node and a wireless communication device, the radio network node comprising:
  a processor module and a memory, wherein the memory stores a computer program, when executed by the processor module, causes the radio network node to be configured for:
    receiving, from a second core network node, an Access Stratum bearer request for setting up the Access Stratum bearer to carry traffic between the first core network node and the wireless communication device, wherein the Access Stratum bearer request includes a first AS Quality of Service profile, a second AS Quality of Service profile, and at least one criterion for applying the first or second AS Quality of Service profile when processing the traffic, wherein the Access Stratum bearer is to carry the traffic at Access Stratum level, wherein the Access Stratum level refers to a level that the radio network node is able to interpret and process the traffic passing through; and
    processing the traffic while applying the first or second AS Quality of Service profile to the traffic based on whether or not one of the at least one criterion is fulfilled;
    receiving information indicating fulfillment of one of the at least one criterion; and
    selecting the first or second AS Quality of Service profile for the traffic based on the information indicating the fulfillment of one of the at least one criterion.

29. The radio network node according to claim 28, wherein the at least one criterion specifies one or more of:
  an identity for radio network nodes,
  an identity for radio network cells,
  an identity for closed subscriber groups,
  a membership of a closed subscriber group,
  an identity for identifying packets of the traffic, the identity being associated with the first or second AS Quality of Service profile,
  an identity for applications generating the traffic, and
  an identity for services generating the traffic.

30. The radio network node according to claim 29, when the at least one criterion specifies an identity for closed subscriber groups, wherein the radio network node is configured for processing the traffic when the wireless communication device belongs to a closed subscriber group having an identity equal to the identity specified by the at least one criterion.

31. The radio network node according to claim 28, wherein the radio network node is configured for receiving information indicating fulfillment of one of the at least one criterion by receiving, from the first core network node or from the second core network node or from the wireless communication device, the information indicating fulfillment of one of the at least one criterion.

32. The radio network node according to claim 28, wherein the radio network node is further configured for detecting fulfillment of one of the at least one criterion.

33. The radio network node according to claim 28, wherein the radio network node is configured for sending, to the first core network node or to the second core network node or to the wireless communication device, the information indicating fulfillment of one of the at least one criterion.

34. A first core network node for handling traffic on a common bearer, wherein the common bearer is capable of carrying the traffic between the first core network node and a wireless communication device, wherein the first core network node manages at least one criterion for applying a first or a second common Quality of Service profile when processing the traffic, the first core network node comprising:
  a processor module and a memory, wherein the memory stores a computer program, when executed by the processor module, causes the first core network node to be configured for:
    receiving, from a second core network node, a common bearer request for setting up the common bearer to carry traffic between the first core network node and the wireless communication device, wherein the common bearer request includes a first common Quality of Service profile, a second common Quality of Service profile, and at least one criterion for applying the first or second common Quality of Service profile when processing the traffic, wherein the common bearer is one of an Access Stratum (AS) bearer or an Non-Access Stratum (NAS) bearer for carrying the traffic via a radio network node at AS level or NAS level respectively, and wherein the AS level refers to a level that the radio network node is able to interpret and process the traffic passing through while the NAS level refers to a level that the radio network node is not able to do so;
    processing the traffic while applying the first or second common Quality of Service profile;
    receiving information indicating fulfillment of one of the at least one criterion; and
    selecting the first or second AS Quality of Service profile for the traffic based on the information indicating the fulfillment of one of the at least one criterion.

35. The first core network node according to claim 34, wherein the at least one criterion specifies one or more of:
  an identity for radio network nodes,
  an identity for radio network cells,
  an identity for closed subscriber groups,
  a membership of a closed subscriber group,
  an identity for identifying packets of the traffic, the identity being associated with the first or second common Quality of Service profile,
  an identity for applications generating the traffic, and
  an identity for services generating the traffic.

36. The first core network node according to claim 34, wherein the first core network node is configured for receiving, from a second core network node or a radio network node or the wireless communication device, the information indicating fulfillment of one of the at least one criterion.

37. The first core network node according to claim 34, wherein the first core network node is configured for detecting fulfillment of one of the at least one criterion, thereby generating the information indicating fulfillment of one of the at least one criterion.

38. The first core network node according to claim 34, wherein the first core network node is configured for sending, to the wireless communication device or the radio network node or the second core network node, the information about fulfillment of one of the at least one criterion.

39. The first core network node according to claim 34, wherein the common bearer request is an AS bearer request sent to the radio network node, wherein the first common Quality of Service profile comprises a first AS Quality of Service profile relating to the AS bearer and the second Quality of Service profile comprises a second AS Quality of Service profile relating to the AS bearer.

40. The first core network node according to claim 34, wherein the bearer request is an NAS bearer request sent to the wireless communication device, wherein the first common Quality of Service profile comprises a first NAS Quality of Service profile relating to the NAS bearer and the second common Quality of Service profile comprises a second NAS Quality of Service profile relating to the AS bearer.

41. A second core network node for managing a common bearer, wherein the common bearer is capable of carrying traffic between a first core network node and a wireless communication device, the second core network node comprising:
a processor module and a memory, wherein the memory store a computer program, when executed by the processor module causes the second core network node to be configured for:
obtaining information about a first common Quality of Service profile and a second common Quality of Service profile and at least one criterion for applying a first or a second common Quality of Service profile when processing the traffic; and
sending, to a radio network node or the first core network node, a common bearer request for setting up the common bearer, wherein the common bearer request includes the first and second common Quality of Service profiles, and the at least one criterion, wherein the common bearer is one of an Access Stratum (AS) bearer or an Non-Access Stratum (NAS) bearer for carrying the traffic via a radio network node at AS level or NAS level respectively, and wherein the AS level refers to a level that the radio network node is able to interpret and process the traffic passing through while the NAS level refers to a level that the radio network node is not able to do so;
receiving information indicating fulfillment of one of the at least one criterion; and
selecting the first or second AS Quality of Service profile for the traffic based on the information indicating the fulfillment of one of the at least one criterion.

42. The second core network node according to claim 41, wherein the second core network node is configured for receiving, from the first core network node or the radio network node or the wireless communication device, the information indicating fulfillment of one of the at least one criterion.

43. The second core network node according to claim 41, wherein the second core network node is configured for detecting fulfillment of one of the at least one criterion, thereby generating the information indicating fulfillment of one of the at least one criterion.

44. The second core network node according to claim 41, wherein the second core network node is configured for sending, to the wireless communication device or the radio network node or the first core network node, the information about fulfillment of one of the at least one criterion.

45. The second core network node according to claim 41, wherein the at least one criterion specifies one or more of:
an identity for radio network nodes,
an identity for radio network cells,
an identity for closed subscriber groups,
a membership of a closed subscriber group,
an identity for identifying packets of the traffic, the identity being associated with the first or second common Quality of Service profile, and
an identity for applications generating the traffic, and/or
an identity for services generating the traffic.

46. The second core network node according to claim 41, wherein the common bearer request is an AS bearer request sent to the radio network node, wherein the first common Quality of Service profile comprises a first AS Quality of Service profile relating to the AS bearer and the second Quality of Service profile comprises a second AS Quality of Service profile relating to the AS bearer.

47. The second core network node according to claim 41, wherein the bearer request is an NAS bearer request sent to the wireless communication device, wherein the first common Quality of Service profile comprises a first NAS Quality of Service profile relating to the NAS bearer and the second common Quality of Service profile comprises a second NAS Quality of Service profile relating to the AS bearer.

48. A wireless communication device for handling traffic on a common bearer, wherein the common bearer is capable of carrying the traffic between the wireless communication device and a first core network node, the wireless communication device comprising:
a processor module and a memory, wherein the memory stores a computer program, when executed by the processor module, causes the wireless communication device to be configured for:
receiving, from a radio network node or a second core network node, a common bearer request for setting up the common bearer and information relating to which of a first common Quality of Service profile and a second common Quality of Service profile to apply when processing the traffic, wherein the common bearer request includes the first common Quality of Service profile and the second common Quality of Service profile, wherein the common bearer is one of an Access Stratum (AS) bearer or an Non-Access Stratum (NAS) bearer for carrying the traffic via a radio network node at AS level or NAS level respectively, and wherein the AS level refers to a level that the radio network node is able to interpret and process the traffic passing through while the NAS level refers to a level that the radio network node is not able to do so;
processing the traffic while applying the first or second common Quality of Service profile as derived from the information relating to which of the first and second common Quality of Service profiles to apply when processing the traffic;
receiving information indicating fulfillment of one of the at least one criterion; and
selecting the first or second AS Quality of Service profile for the traffic based on the information indicating the fulfillment of one of the at least one criterion.

49. The wireless communication device according to claim 48, wherein the information relating to which of the first and second Quality of Service profiles to apply when processing the traffic comprises at least one criterion for applying the first common Quality of Service profile or the second common Quality of Service profile when processing the traffic, wherein the wireless communication device is configured for detecting fulfillment of one of the at least one criterion; and wherein the wireless communication device is configured for processing the traffic by processing the traffic while applying the first or second common Quality of Service profile according to the fulfilled one of the at least one criterion.

50. The wireless communication device according to claim 49, wherein the at least one criterion specifies one or more of:
an identity for radio network nodes,
an identity for radio network cells,
an identity for closed subscriber groups,
a membership of a closed subscriber group,
an identity for identifying packets of the traffic, the identity being associated with the first or second common Quality of Service profile, and
an identity for applications generating the traffic, and/or
an identity for services generating the traffic.

51. The wireless communication device according to claim 48, wherein the information relating to which of the first and second Quality of Service profiles comprises information indicating fulfillment of one of the at least one criterion.

52. The wireless communication device according to claim 48, wherein the wireless communication device is configured for sending, to the radio network node or the first core network node or the second core network node, information indicating fulfillment of one of the at least one criterion.

53. The wireless communication device according to claim 48, wherein the common bearer request is an AS bearer request sent from the radio network node, wherein the first common Quality of Service profile comprises a first AS Quality of Service profile relating to the AS bearer and the second Quality of Service profile comprises a second AS Quality of Service profile relating to the AS bearer.

54. The wireless communication device according to claim 48, wherein the common bearer request is a NAS bearer request sent from the second core network node, wherein the first common Quality of Service profile comprises a first NAS Quality of Service profile relating to the NAS bearer and the second common Quality of Service profile comprises a second NAS Quality of Service profile relating to the AS bearer.

* * * * *